(12) United States Patent
Tange

(10) Patent No.: US 9,410,604 B2
(45) Date of Patent: Aug. 9, 2016

(54) CONTINUOUSLY VARIABLE TRANSMISSION

(75) Inventor: Hiroshi Tange, Fuji (JP)

(73) Assignee: JATCO LTD, Fuji-Shi (JP)

( * ) Notice: Subject to any disclaimer, the term of this patent is extended or adjusted under 35 U.S.C. 154(b) by 154 days.

(21) Appl. No.: 14/387,996

(22) PCT Filed: Mar. 28, 2012

(86) PCT No.: PCT/JP2012/058198
§ 371 (c)(1),
(2), (4) Date: Sep. 25, 2014

(87) PCT Pub. No.: WO2013/145171
PCT Pub. Date: Oct. 3, 2013

(65) Prior Publication Data
US 2015/0045176 A1    Feb. 12, 2015

(51) Int. Cl.
*F16H 15/14*    (2006.01)

(52) U.S. Cl.
CPC ..................... *F16H 15/14* (2013.01)

(58) Field of Classification Search
CPC .......... F16H 15/14; F16H 15/04; F16H 15/08
See application file for complete search history.

(56) References Cited

U.S. PATENT DOCUMENTS

| | | | | |
|---|---|---|---|---|
| 1,220,554 A | * | 3/1917 | Reher | F16H 15/14 476/31 |
| 2,958,229 A | * | 11/1960 | Sorkin | F16H 15/44 476/49 |
| 3,240,078 A | * | 3/1966 | Newell | F16H 15/14 476/11 |
| 3,871,239 A | | 3/1975 | Steinhagen | |
| 8,177,678 B2 | * | 5/2012 | Tange | F16H 15/46 476/49 |
| 8,382,637 B2 | * | 2/2013 | Tange | F16H 15/46 476/49 |
| 2010/0056323 A1 | | 3/2010 | Tange | |
| 2010/0056324 A1 | * | 3/2010 | Tange | F16H 15/14 476/54 |

FOREIGN PATENT DOCUMENTS

| | | |
|---|---|---|
| JP | 32-14723 Y1 | 11/1957 |
| JP | 37-429 Y1 | 1/1962 |
| JP | 40-4888 B1 | 3/1965 |
| JP | 2009-243603 A | 10/2009 |
| JP | 2010-53995 A | 3/2010 |

* cited by examiner

*Primary Examiner* — David M Fenstermacher
(74) *Attorney, Agent, or Firm* — Foley & Lardner LLP

(57) ABSTRACT

Disclosed is a continuously variable transmission including: a pair of pressing units; a pair of first support units that support the pressing units by using one end side as a fulcrum, and generate a force for clamping and pressing both the disks using the pressing unit by virtue of a clamping force applied to the other end side; a pair of second support units that extend along a connecting line in parallel with the shaft center connecting line and are configured to clamp and support both the disks such that the other end side of the pair of first support units can move along the connecting line to generate the clamping force; and a clamping force adjustment unit connected to an end of the pair of second support units opposite to the pivot shaft side to adjust the clamping force of the second support units.

7 Claims, 21 Drawing Sheets

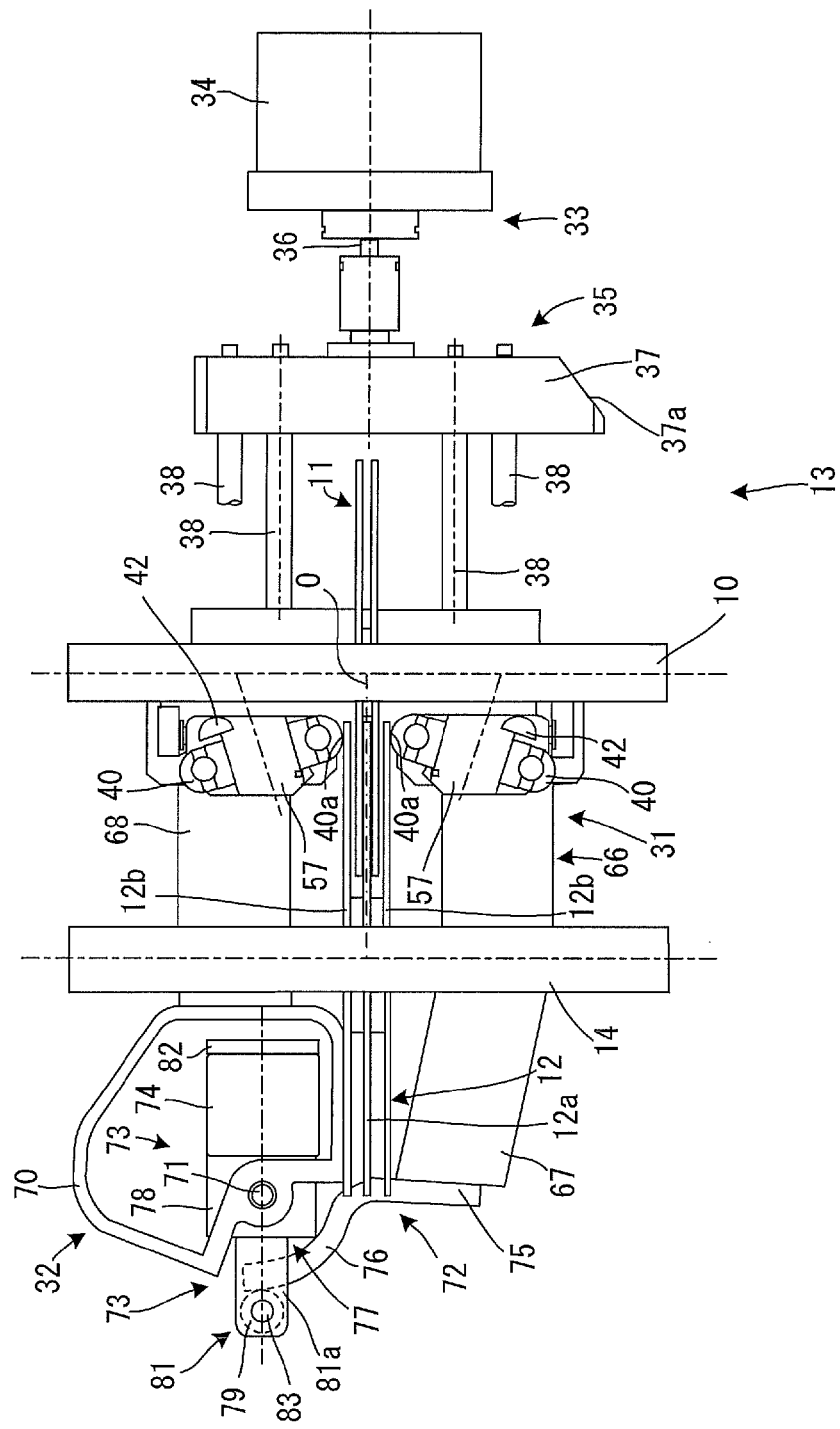

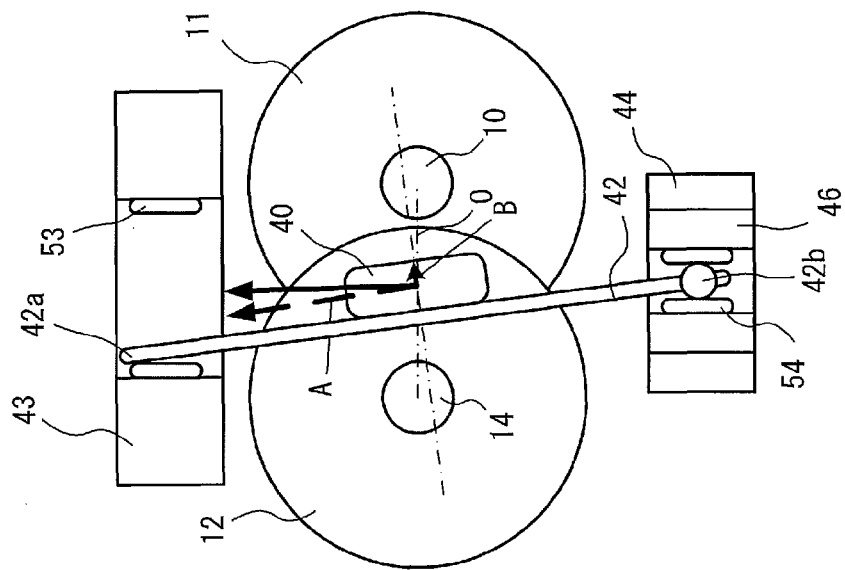
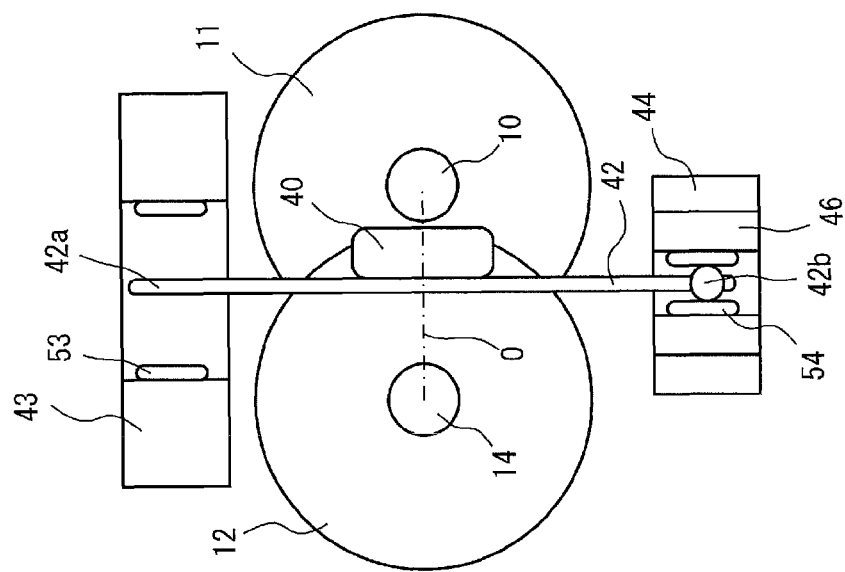
FIG. 12A
FIG. 12B

CONTINUOUSLY VARIABLE TRANSMISSION

TECHNICAL FIELD

The present invention relates to a continuously variable transmission.

BACKGROUND ART

In the related art, a transmission unit was discussed in JP 2010-53995 A, in which a disk overlapping area where a part of an input disk and a part of an output disk are overlapped with each other is provided, and the input disk and the output disk are clamped between a pair of pressing rollers to make contact with each other in the disk overlapping area.

SUMMARY OF INVENTION

However, in the technique described above, since a pair of rollers are directly clamped using a biasing force of the spring, the biasing force generated using the spring to transmit rotation of the input disk to the output disk disadvantageously increases.

It is therefore an object of this disclosure to generate a clamping force necessary to transmit rotation of the input disk to the output disk with a weak force.

According to an aspect of this disclosure, there is provided a continuously variable transmission including: an input shaft connected to a motor and supported by a transmission unit casing member; an output shaft arranged in parallel with the input shaft and supported by the transmission unit casing member; a discoidal input disk that is provided in the input shaft and has an outer circumferential edge arranged close to the output shaft; a discoidal output disk that is provided in the output shaft and has an outer circumferential edge arranged close to the input shaft; and a pair of pressing means provided movably along a shaft center connecting line obtained by connecting a shaft center of the input shaft and a shaft center of the output shaft in a disk overlapping area where the input disk and the output disk are overlapped, so that a torque transmission contact portion is formed by clamping and pressing both the disks in a position corresponding to a target shift ratio to elastically deform both the disks. The continuously variable transmission includes: a pair of first support means that extend to intersect with the shaft center connecting line, support the pressing means by using one end side as a fulcrum, move along the shaft center connecting line in synchronization with the pressing means, and are configured to generate a force for clamping and pressing both the disks using the pressing means by virtue of a clamping force applied to the other end side; a pair of second support means that extend along a connecting line in parallel with the shaft center connecting line and are configured to clamp and support both the disks by using a pivot shaft as a fulcrum such that the other end side of the pair of first support means can move along the connecting line to generate the clamping force; and a clamping force adjustment means connected to an end of the pair of second support means opposite to the pivot shaft side to adjust the clamping force of the second support means.

In this aspect, the continuously variable transmission has the first support means that clamp and press both disks with the pressing means by using one end side as a fulcrum, the second support means that clamp the first support means by using the pivot shaft as a fulcrum, and the clamping force adjustment unit that adjusts the clamping force of the second support means. Therefore, it is possible to form the torque transmission contact portion with a weak force and transmit rotation from the input disk to the output disk.

BRIEF DESCRIPTION OF DRAWINGS

FIG. 4A is a cross-sectional view taken along a line IV-IV of FIG. 2;

FIG. 12A is a diagram for describing a motion of the pressing roller;

FIG. 12B is a diagram for describing a motion of the pressing roller;

DESCRIPTION OF EMBODIMENTS

Hereinafter, embodiments of this disclosure will be described with reference to the accompanying drawing.

Figure 1:
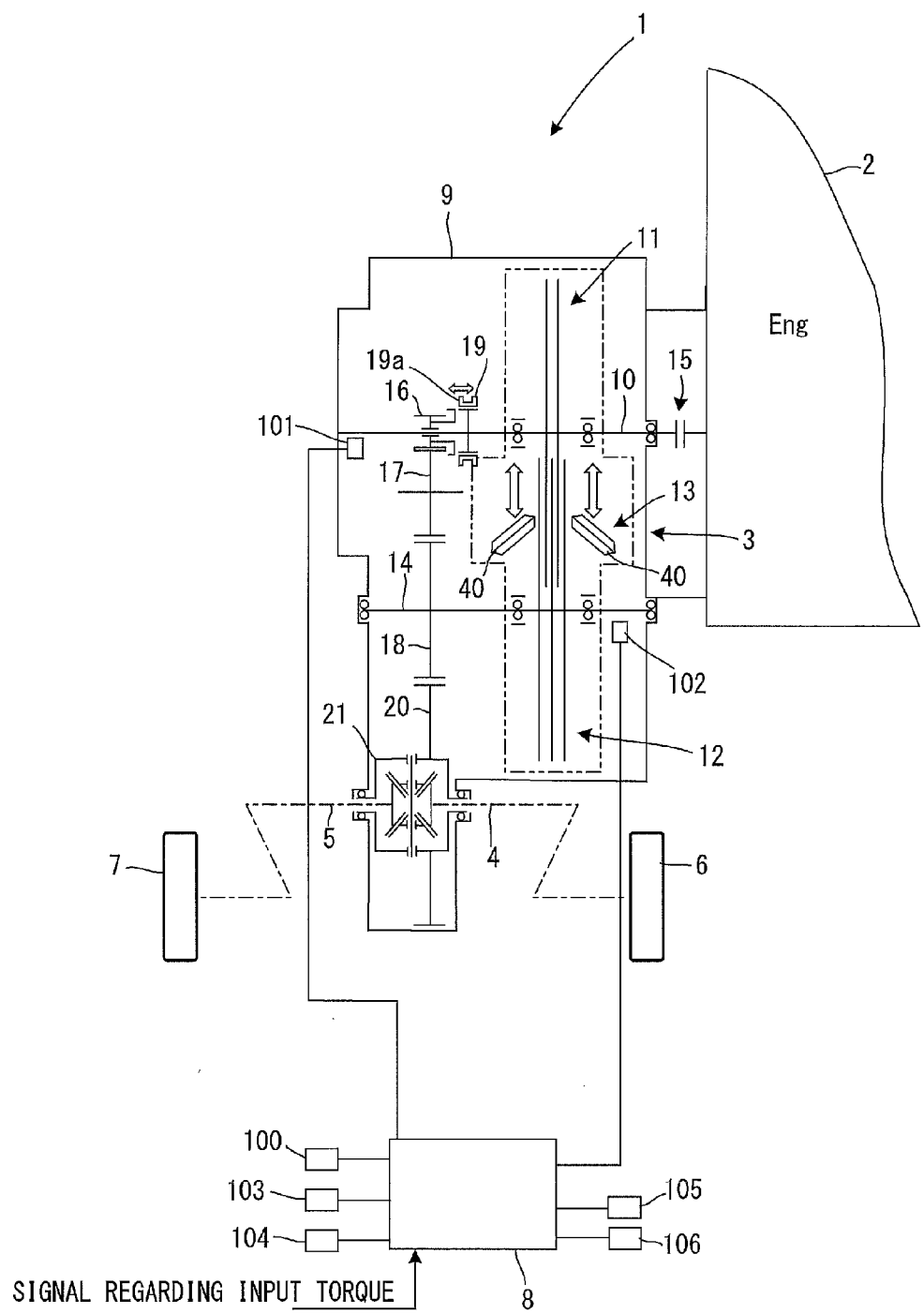
FIG. 1 is a schematic diagram illustrating the entire configuration of a vehicle automatic transmission system.

FIG. 1 is a schematic diagram illustrating the entire configuration of a vehicle automatic transmission system having a multi-disk continuously variable transmission unit according to this disclosure.

The vehicle automatic transmission system 1 includes an engine 2; a multi-disk continuously variable transmission unit (hereinafter, referred to as a "transmission unit") 3, left and right driving shafts 4 and 5, left and right driving wheels 6 and 7, and a control unit (hereinafter, referred to as a "ATCU") 8.

The transmission unit 3 includes a transmission unit casing 9, an input shaft 10, a primary disk 11, a secondary disk 12, a pressing mechanism 13, an output shaft 14, a dry starter clutch 15 known in the art, a reverse gear 16, a reverse idler gear 17, an output gear 18, a synchronization mechanism 19, a final gear 20, and a differential gear unit 21.

The vehicle automatic transmission system 1 has a three-shaft configuration including the input shaft 10, the output shaft 14, and the driving shafts 4 and 5.

The input shaft 10 and the output shaft 14 are arranged in parallel with a shaft center of the input shaft 10 and a shaft center of the output shaft 14. The input shaft 10 and the output shaft 14 are rotatably supported by the transmission unit casing 9.

Figure 2:
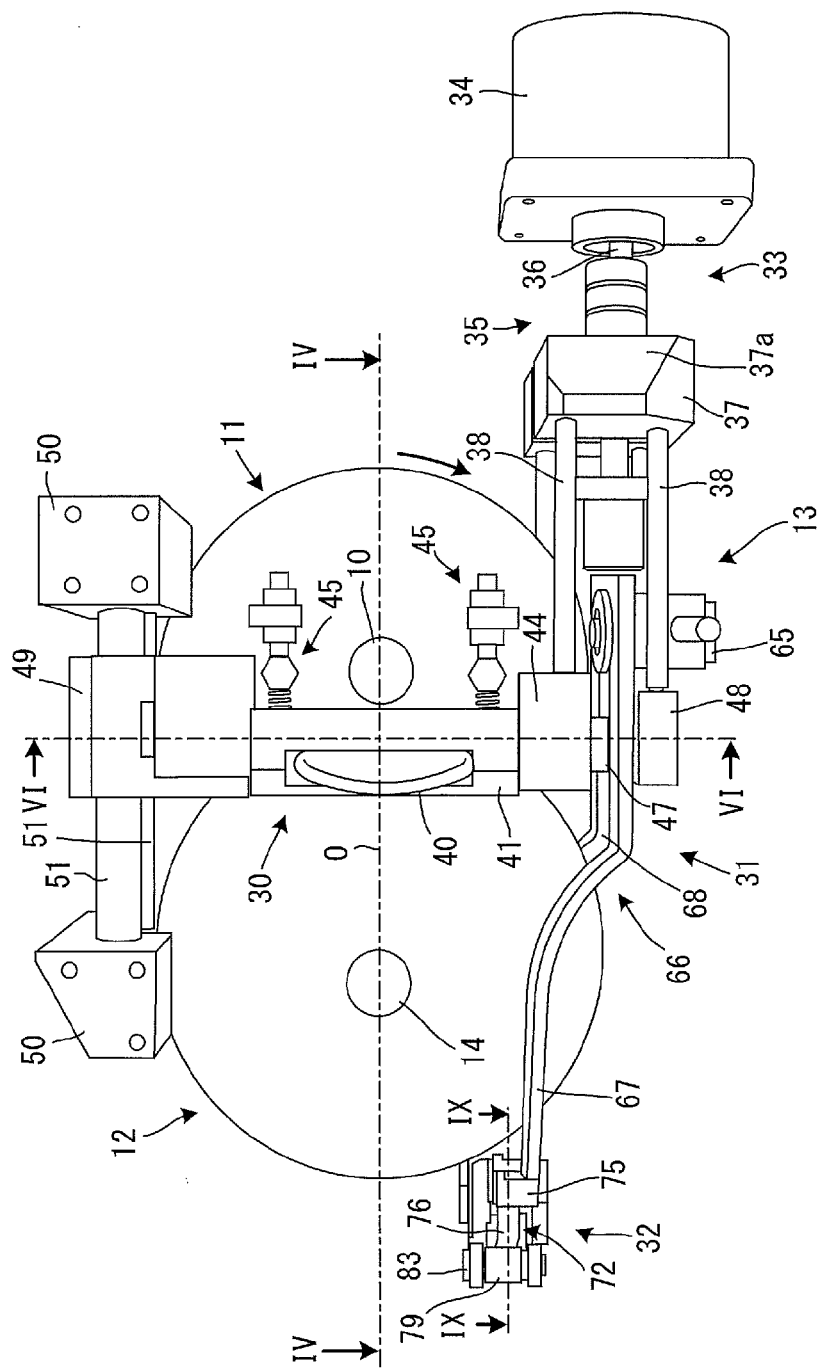
FIG. 2 is a diagram illustrating a transmission unit as seen from an engine side.
Figure 3:
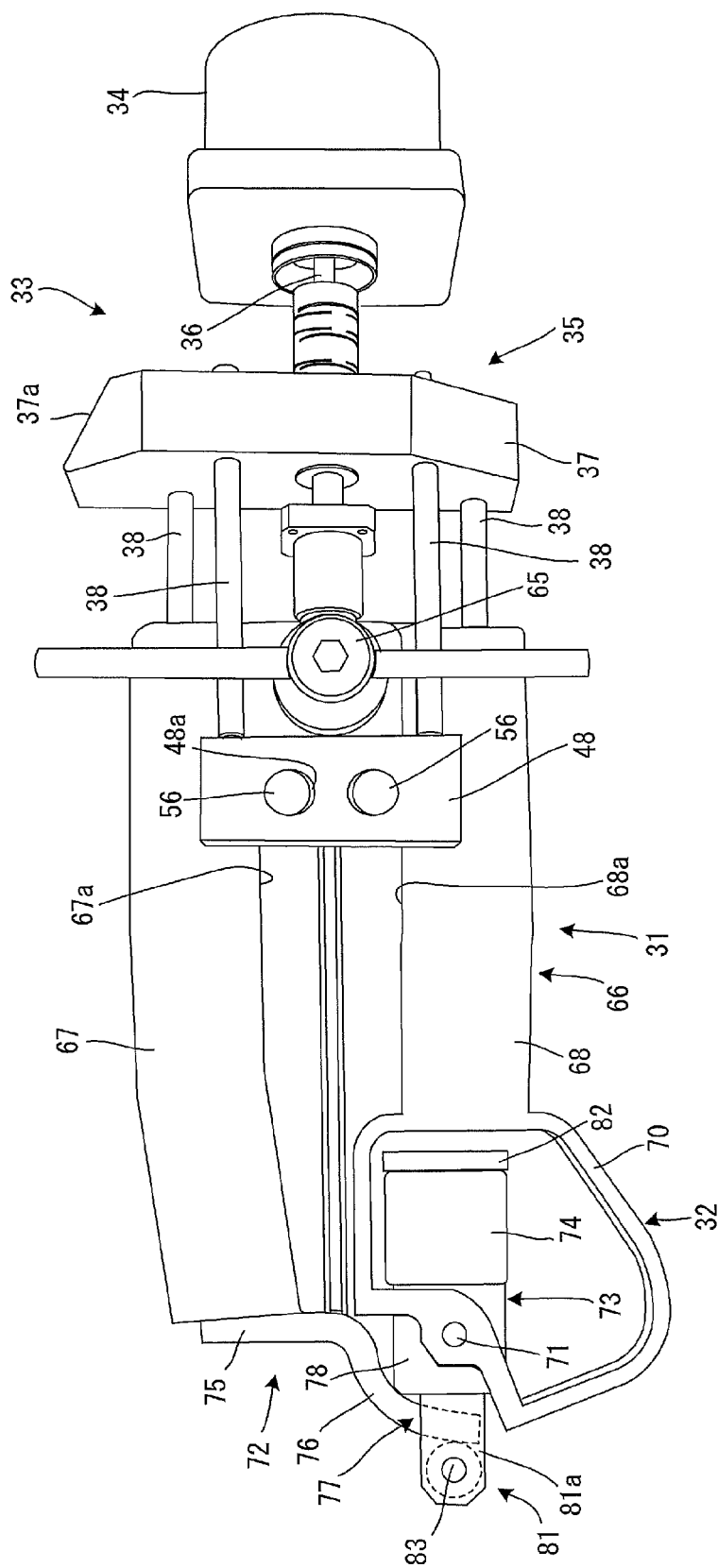
FIG. 3 is a bottom view of FIG. 2.

The transmission unit 3 will be described in detail with reference to FIGS. 2 and 3. FIG. 2 is a diagram illustrating the transmission unit 3 as seen from the engine side 2. FIG. 3 is a bottom view of FIG. 2. FIG. 4A is a cross-sectional view taken along a line IV-IV of FIG. 2. It is noted that a part of elements are omitted intentionally in the drawings subsequent to FIG. 2 for convenient description purposes.

Figure 4B:
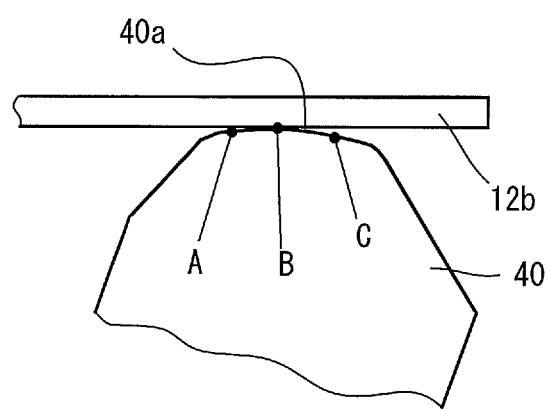
FIG. 4B is an enlarged view illustrating a vicinity of a contact area between a pressing roller and a side disk.
Figure 5A:
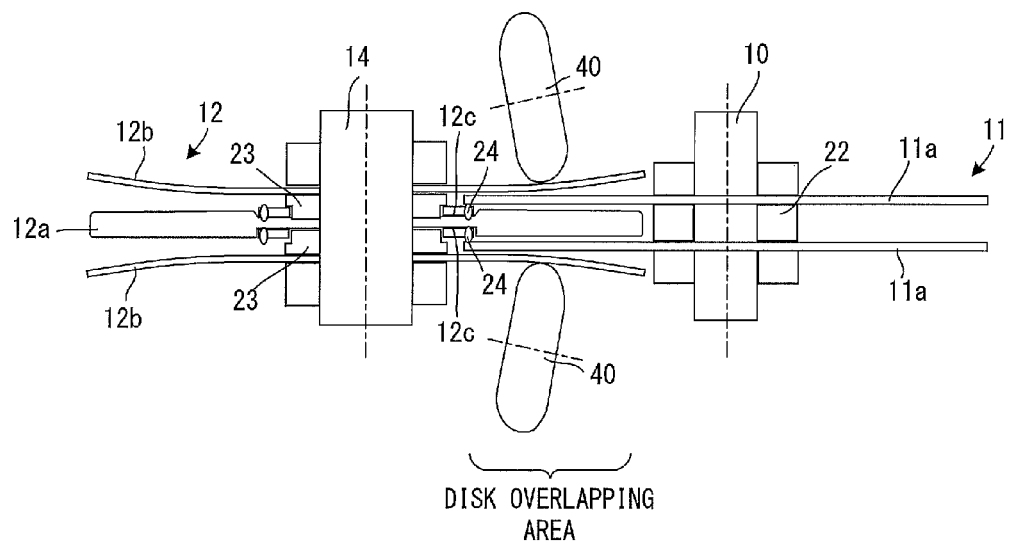
FIG. 5A is a schematic diagram illustrating a vicinity of the input disk and the output disk of FIG. 4A.
Figure 5B:
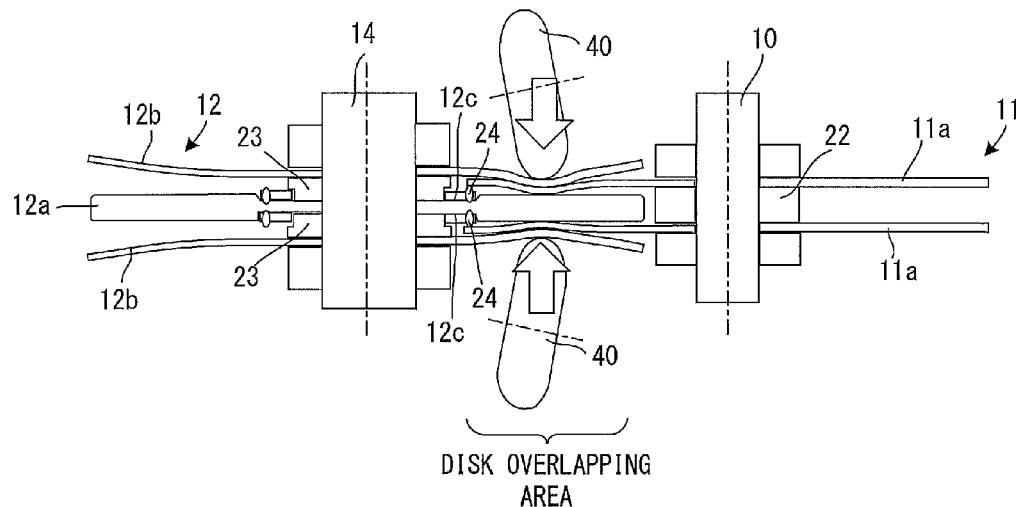
FIG. 5B is a schematic diagram illustrating a vicinity of the input disk and the output disk of FIG. 4A.

The primary disk 11 is configured by arranging a pair of circular disks 11a along an axial direction of the input shaft 10 and installing them in the input shaft 10 as illustrated in FIGS. 5A and 5B such that they are rotated in synchronization with the input shaft 10. FIG. 5 is a schematic diagram illustrating vicinities of the input shaft 10 and the output shaft 14 of FIG. 4A. A spacer 22 is provided between the pair of disks 11a, and the pair of disks 11a are arranged with a predetermined interval using the spacer 22 in the axial direction of the input shaft 10. The primary disk 11 is arranged such that an outer circumferential edge of the disk 11a is close to the output shaft 14. The primary disk 11 is rotated in the arrow direction of FIG. 2 along with the input shaft 10.

The secondary disk 12 has a center disk 12a and a pair of side disks 12b arranged in both sides of the central disk 12a to face each other. The secondary disk 12 is configured by arranging the center disk 12a and the side disks 12b along the axial direction of the output shaft 14 and installing them in the output shaft 14 as illustrated in FIGS. 5A and 5B such that they are rotated in synchronization with the output shaft 14. A spacer 23 is provided between the center disk 12a and the side disk 12b, and the center disk 12a and the side disk 12b are arranged with a predetermined interval using the spacer 23 in the axial direction of the output shaft 14. The secondary disk 12 is arranged such that the outer circumferential edge of the center disk 12a and the outer circumferential edge of the side disk 12b are close to the input shaft 10.

The center disk 12a is a circular disk having a larger thickness in an axial direction of the output shaft 14 than those of the side disk 12b and the disk 11a of the primary disk 11. In the center disk 12a, a hollow 12c is formed in the inner radial side, and a thrust ball bearing 24 is provided in the hollow 12C.

The side disk 12b is a circular disk and is warped such that a distance from the center disk 12a increases toward an outer radial side.

The disk 11a of the primary disk 11 is arranged between the side disk 12b and the center disk 12a of the secondary disk 12. The primary disk 11 and the secondary disk 12 form a disk overlapping area where the disks are partially overlapped between the input shaft 10 and the output shaft 14. The center disk 12a is positioned in the center of the disk overlapping area in the axial direction of the input shaft 10.

In the disk overlapping area, the outer circumferential edge of the output shaft 14 side of the disk 11a of the primary disk 11 is supported by the thrust ball bearing 24, so that a gap is formed between the disk 11a of the primary disk 11 and the center disk 12a while a pressing force of the pressing mechanism 13 described below is not applied. In addition, since the side disk 12b of the secondary disk 12 is warped such that a distance from the center disk 12a increases toward the outer circumferential edge side, a gap is formed between the disk 11a of the primary disk 11 and the side disk 12b of the secondary disk 12. For this reason, in the disk overlapping area, if a clamping/pressing force (hereinafter, referred to as a thrust force) is not applied to the primary disk 11 and the secondary disk 12 by the pressing mechanism 13, or if the thrust force is weak, the primary disk 11 and the secondary disk 12 do not make contact as illustrated in FIG. 5A. Meanwhile, as the thrust force caused by the pressing mechanism 13 increases, the primary disk 11 and the secondary disk 12 are elastically deformed as illustrated in FIG. 5B, and the primary disk 11 and secondary disk 12 make contact with each other, so that a torque transmission contact portion is formed. By forming the torque transmission contact portion between the primary disk 11 and secondary disk 12, rotation is transmitted from the input shaft 10 to the output shaft 14.

The pressing mechanism 13 includes a pair of pressing roller mechanisms 30, a pair of disk clamp mechanisms 31, a clamping force adjustment mechanism 32, and a first actuator 33.

The first actuator 33 shifts the pressing roller mechanism 30 along a shaft center connecting line O obtained by connecting a shaft center of the input shaft 10 and a shaft center of the output shaft 14. The shaft center connecting line O is perpendicular to the shaft center of the input shaft 10 and the shaft center of the output shaft 14.

The first actuator 33 has an electric motor 34 and a ball screw mechanism 35. The ball screw mechanism 35 includes a screw shaft 36, a bracket 37, and a ball (not illustrated).

The screw shaft 36 has one end connected to a rotation shaft of the electric motor 34 and is rotated in a forward or backward direction depending on a rotational direction of the rotation shaft of the electric motor 34. The screw shaft 36 extends in the shaft center connecting line O direction. A plurality of balls (not illustrated) are provided rollably between the screw shaft 36 and the bracket 37.

As the screw shaft 36 rotates, the bracket 37 moves along the axial direction of the screw shaft 36, that is, the shaft center connecting line O direction in response to the rotation of the screw shaft 36. In the bracket 37, a tapered surface 37a is formed on the surface of the engine 2 side such that the distance from the screw shaft 36 is reduced toward the electric motor 34 side. As the bracket 37 reciprocates by the electric motor 34, a pushrod (not illustrated) such as a cam follower that follows the tapered surface 37a reciprocates on the tapered surface 37a, so that a release lever of the dry starter clutch 15 is driven by the pushrod to perform a clutch lock/unlock operation.

The bracket 37 is connected to a second support portion 44 of the pressing roller mechanism 30 and a roller follower support block 48 described below in detail through a first shaft 38 extending in the shaft center connecting line O direction. As the screw shaft 36 is rotated by the electric motor 34, the bracket 37 moves forward or backward along the shaft center connecting line O depending on a rotational direction of the screw shaft 36, and the pressing roller mechanism 30 moves forward or backward along the shaft center connecting line O in synchronization with the bracket 37 and the first shaft 38.

Figure 6A:
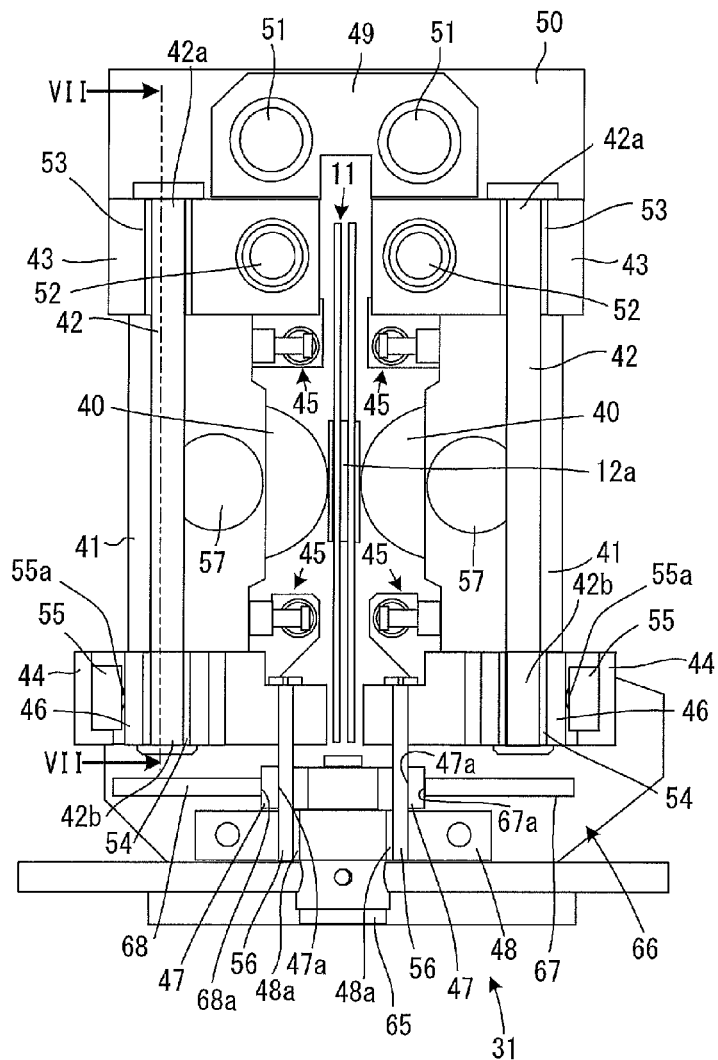
FIG. 6A is a cross-sectional view taken along a line VI-VI of FIG. 2.
Figure 6B:
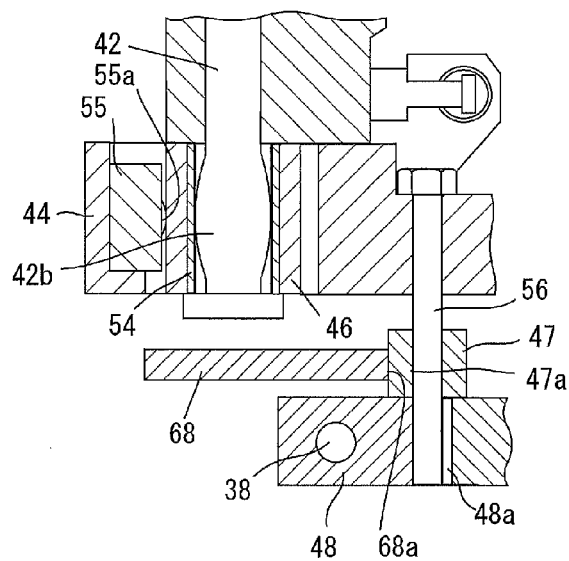
FIG. 6B is an enlarged view illustrating a vicinity of an end of a pressing roller shaft.

A description will now be made for the pressing roller mechanism 30 with reference to FIGS. 6A and 6B. FIG. 6A is a cross-sectional view taken along the line VI-VI of FIG. 2. FIG. 6B is an enlarged view illustrating a vicinity of an end 42b of the pressing roller shaft 42.

The pressing roller mechanism 30 includes a pressing roller 40, a holding portion 41, a pressing roller shaft 42, a first support portion 43, a second support portion 44, a biasing portion 45, a support block 46, and a first roller follower 47.

A pair of pressing roller mechanisms 30 are arranged symmetrically with respect to the center disk 12a of the secondary disk 12 and is installed in the guide block 49 in an upper side. The guide block 49 is provided between a pair of guide shaft blocks 50 installed in the transmission unit casing 9 and is slidably supported by a pair of the guide shafts 51 extending in the shaft center connecting line O direction. That is, a pair of pressing roller mechanisms 30 are slidably supported by the guide shaft 51 using the guide block 49 and move in the shaft center connecting line O direction by the first actuator 33, so that the torque transmission contact portion is formed in a position corresponding to the target shift ratio.

The pressing roller shaft 42 extends to intersect with the shaft center connecting line O direction and has one end 42a supported by the first support portion 43 and the other end 42b supported by the second support portion 44. In the pressing roller shaft 42, the end 42b supported by the second support portion 44 has a spherical shape. The holding portion 41 that supports the pressing roller 40 between the first support portion 43 and the second support portion 44 is installed in the pressing roller shaft 42.

The first support portion 43 is provided in a downstream side from the pressing roller 40 in the rotational direction of the primary disk 11 and is pivotably supported by the guide block 49 using a pivot shaft 52 provided in parallel with the guide shaft 51. The first support portion 43 supports one end 42a of the pressing roller shaft 42 using a needle bearing 53.

The second support portion 44 is provided in an upstream side from the pressing roller 40 in the rotational direction of the primary disk 11 and supports the other end 42b of the pressing roller shaft 42 using the support block 46 and the needle bearing 54. A bushing 55 having a spherical leading edge 55a is provided between the second support portion 44 and the support block 46 in the axial direction of the input shaft 10 so that a gap is formed between the second support portion 44 and the support block 46. The gap in the axial direction of the input shaft 10 is positioned in the primary disk 11 side from the bushing 55, and the leading edge 55a of the bushing 55 abuts on the support block 46. The second support portion 44 is connected to an end of the second shaft 56 where the first roller follower 47 is installed, and the second shaft 56 extends in a direction perpendicular to the shaft center connecting line O direction and the shaft center connecting line O direction and the axial direction of the input shaft 10. The second support portion 44 moves in the axial direction of the input shaft 10 by virtue of the clamping force applied to the first roller follower 47. In response to movement of the second support portion 44 to the axial direction of the input shaft 10, the holding portion 41 that supports the first support portion 43, the pressing roller shaft 42, and the pressing roller 40 is pivoted with respect to the shaft center of the pivot shaft 52.

Figure 7:
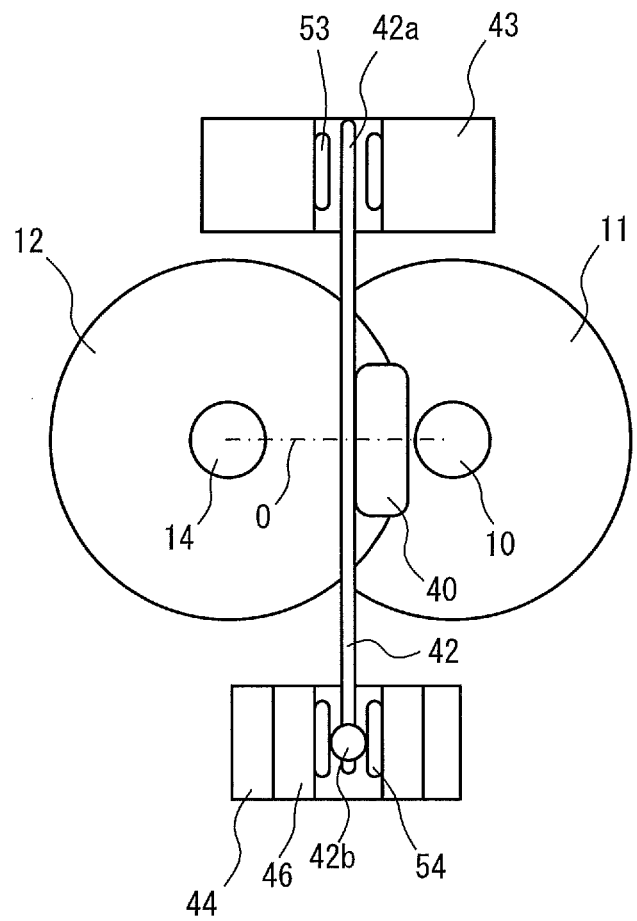
FIG. 7 is a schematic diagram illustrating a cross section taken along a line VII-VII of FIG. 6.

The first support portion 43 is provided to form a gap between the needle bearing 53 and the pressing roller shaft 42 in the shaft center connecting line O direction as illustrated in FIG. 7. FIG. 7 is a schematic diagram taken along the line VII-VII of FIG. 6A. The end 42d of the pressing roller shaft 42 supported by the second support portion 44 has the spherical shape and abuts on the needle bearing 54. The pressing roller shaft 42 is supported by the first and second support portions 43 and 44 tiltably with respect to the shaft center connecting line O.

The pressing roller shaft 42 is pivotably supported by the first support portion 43 using the needle bearing 53 and by the second support portion 44 using the needle bearing 54.

The holding portion 41 is provided between the first and second support portions 43 and 44 and is installed in the pressing roller shaft 42. The holding portion 41 is pivoted and tilted in synchronization with the pressing roller shaft 42. The holding portion 41 is fixed to the first shaft portion 57 that rotatably supports the pressing roller 40. When the pressing roller shaft 42 is located perpendicularly to the shaft center connecting line O as seen from the axial direction of the input shaft 10, the shaft center of the first shaft portion 57 matches the shaft center connecting line O. In addition, the first shaft portion 57 is provided such that the shaft center of the first shaft portion 57 is inclined against a disk plane in FIG. 4A. A tensile stress is applied to the holding portion 41 at all times by virtue of a spring 60 of the biasing portion 45 described below in detail.

The pressing roller 40 is rotatably supported by the first shaft portion 57 and is installed in the pressing roller shaft 42 using the holding portion 41. The pressing roller 40 abuts on the side disk 12b of the secondary disk 12 in the disk overlapping area and rotates with respect to the shaft center of the first shaft portion 57 by virtue of a frictional force with the side disk 12b of the secondary disk 12. A pair of pressing rollers 40 clamp and press the disks 11 and 12 as the clamping force transmitted through the first roller follower 47 increases, so that the disks 11 and 12 are elastically deformed to form the torque transmission contact portion.

The pressing roller 40 is supported by the holding portion 41 and receives a tensile stress from the spring 60 of the biasing portion 45 described below in detail at all times together with the holding portion 41. For this reason, an inclination of the pressing roller 40 to the output shaft 14 side changes depending on the tensile stress from the spring 60 of the biasing portion 45 and the reactive force from the disks 11 and 12.

An abutting portion 40a of the pressing roller 40 abutting on the secondary disk 12 in FIG. 4A is formed by curved surfaces having different curvatures. The abutting portion 40a is formed such that its curvature is reduced toward the leading edge side in the shaft center of the pressing roller 40, and a curved surface having a larger curvature abuts on the secondary disk 12 as the pressing roller 40 is inclined toward the output shaft 14 side. Here, if the pressing roller 40 is further inclined toward the output shaft 14 side, this state will be referred to as "an inclination angle is larger."

Specifically, the curvature of the curved surface of the abutting portion 40a becomes $1/34$, $1/55$, and $1/100$ toward the leading edge side as illustrated in FIG. 4B. In FIG. 4B, a curved surface having a curvature of 1/34 is denoted by a point A, a curved surface having a curvature of 1/55 is denoted by a point B, and a curved surface having a curvature of 1/100 is denoted by a point C. For this reason, as the inclination angle increases, the curvature of the abutting portion 40a abutting on the secondary disk 12 sequentially changes from "1/100," to "1/55," and to "1/34."

As the inclination angle increases, the curvature of the curved surface in the contact region increases. Therefore, an area of the contact region is reduced to a circle-like shape. It is noted that, as the inclination angle increases in this manner, the area of the torque transmission contact portion is reduced to a circle-like shape.

Figure 8:
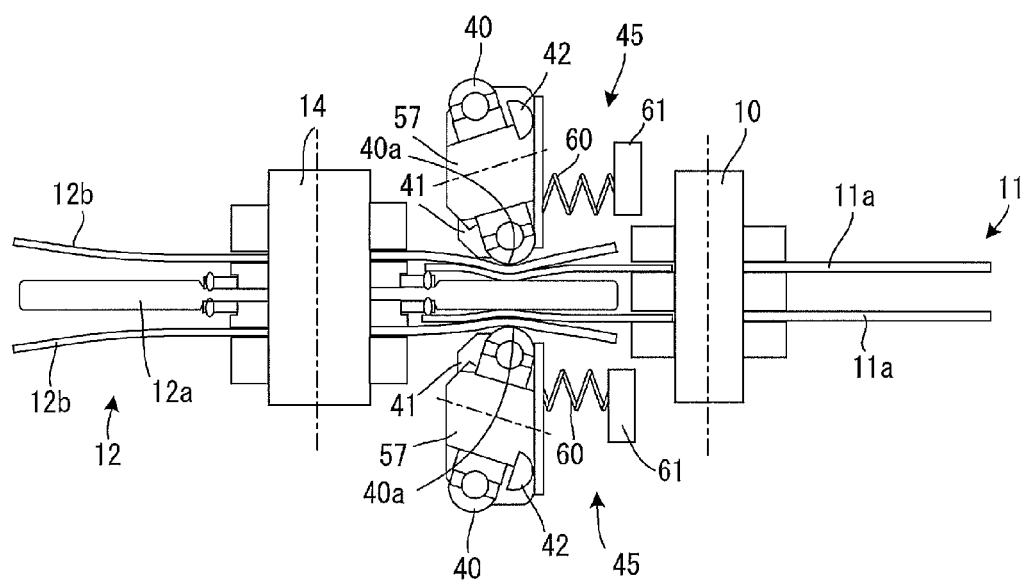
FIG. 8 is a schematic diagram illustrating a relationship between a biasing portion, a holding portion, and a pressing roller.

As illustrated in FIG. 8, the biasing portion 45 has a spring 60 and a fixing portion 61. FIG. 8 is a schematic diagram illustrating a relationship between the biasing portion 45, the holding portion 41, and the pressing roller 40.

One end of the spring 60 is connected to the holding portion 41 in the disk 11 or 12 side, and the other end is connected to the fixing portion 61. The fixing portion 61 is fixed to the first or second support portion 43 or 44 and moves in the shaft center connecting line O direction together with the pressing roller 40.

The biasing portion 45 applies a tensile force for pulling the holding portion 41 and the pressing roller 40 to the input shaft 10 side toward the holding portion 41 and the pressing roller 40 at all times. As a result, a force is applied to the holding portion 41 and the pressing roller 40 in a rotational direction with respect to the shaft center of the pressing roller shaft 42, so that the holding portion 41 and the pressing roller 40 are generally inclined to the output shaft 14 side.

When the thrust force of the pressing roller 40 is weak, the biasing portion 45 abuts on a pulling stopper (not illustrated) that restricts pivoting of the pressing roller 40 and the holding portion 41 to the input shaft 10 side. Even in this state, the stopper is provided such that a contact region between the abutting portion 40a of the pressing roller 40 and the side disk 12b is positioned in the output shaft 14 side relative to a perpendicular line drawn from the shaft center of the pressing roller shaft 42 to the side disk 12b. For this reason, when the primary disk 11 and the secondary disk 12 are clamped and pressed by a pair of pressing rollers 40, a second moment opposite to the first moment generated by the spring 60 is generated in the pressing roller 40 and the holding portion 41 by virtue of the reactive force received by the pressing roller 40 from the primary disk 11 and the secondary disk 12.

As the thrust force of the pressing roller 40 increases, the second moment increases, and the pressing roller 40 and the holding portion 41 are rotated with respect to the shaft center of the pressing roller shaft 42, so that the inclination angle is reduced. In addition, the pressing roller 40 and the holding portion 41 are held in a position where the first and second moments are balanced. As the inclination angle decreases, the curvature of the abutting portion 40a of the pressing roller 40 abutting on the side disk 12b decreases, and the a contact area between the pressing roller 40 and the side disk 12b increases. That is, as the thrust force of the pressing roller 40 increases, the contact area between the pressing roller 40 and the side disk 12b and the area of the torque transmission contact portion increase. As a result, it is possible to suppress an increase of the pressure per unit area in the contact region and the torque transmission contact portion even when the thrust force of the pressing roller 40 increases.

As illustrated in FIG. 6A, the second shaft 56 connected to the second support portion 44 is inserted into the inner circumferential hole 47a and abuts on the side surfaces 67a and 68a of the disks 11 and 12 side of the clamp arm 66 described below, so that the first roller follower 47 is rolled. If the transmission unit 3 is seen from the engine 2 side, a position of the first roller follower 47 approximately matches a position of the torque transmission contact portion formed by a pair of pressing rollers 40 as seen in the extending direction of the pressing roller shaft 42.

An end of the second shaft 56 opposite to the end connected to the second support portion 44 is inserted into a hole 48a formed in the roller follower support block 48. The hole 48a is an elliptical hole formed along the axial line of the input shaft 10. The roller follower support block 48 supports the second shaft 56 along the hole 48a such that the second shaft 56 can slide along the axial line of the input shaft 10. In addition, the roller follower support block 48 is connected to the bracket 37 through the first shaft 38 extending in the shaft center connecting line O direction and moves in the shaft center connecting line O direction depending on movement of the bracket 37.

The disk clamp mechanism 31 includes an arm shaft 65 and a clamp arm 66.

The arm shaft 65 is a circular columnar member extending perpendicularly to the shaft center connecting line O and the input shaft 10. The arm shaft 65 is provided to have a shaft center perpendicular to the shaft center of the input shaft 10 and overlap with the center of the primary disk 11 in the axial direction of the input shaft 10 as illustrated in FIG. 6A.

The clamp arm 66 is a pair of arms including a front clamp arm 67 and a rear clamp arm 68.

The front clamp arm 67 is a plate-like member having an approximately L-shape as illustrated in FIG. 3. One end side of the front clamp arm 67 is pivotably supported by the arm shaft 65. In the other end of the front clamp arm 67, an engagement portion 72 of the clamping force adjustment mechanism 32 described below is formed. A side surface 67a of the front clamp arm 67 in the disk 11 or 12 side (a surface forming a thickness of the plate-like member) abuts on the first roller follower 47 as illustrated in FIG. 6A.

The rear clamp arm 68 is a plate-like member having an approximately L-shape as illustrated in FIG. 3. One end side of the rear clamp arm 68 is pivotably supported by the arm shaft 65. The other end of the rear clamp arm 68 is connected to the casing 70 of the clamping force adjustment mechanism 32 described below. A side surface 68a of the rear clamp arm 68 in the disk 11 or 12 side (a surface forming a thickness of the plate-like member) abuts on the first roller follower 47 as illustrated in FIG. 6A.

Each of the front and rear clamp arms 67 and 68 is pivotably supported by the arm shaft 65, and the clamp arm 66 is pivoted by using the arm shaft 65 as a fulcrum by virtue of the clamping force generated by the clamping force adjustment mechanism 32, so that the clamping force of the disks 11 and 12 is adjusted by driving a pair of pressing roller mechanisms 30.

The clamping force adjustment mechanism 32 includes a casing 70, a second shaft portion 71, an engagement portion 72, a pivot portion 73, a compression spring 74, and a second actuator (not illustrated).

The casing 70 is connected to an end of the rear clamp arm 68. The casing 70 houses a part of the pivot portion 73 and is installed with the second shaft portion 71.

The second shaft portion 71 is a circular columnar member having a shaft center in parallel with the shaft center of the arm shaft 65. The second shaft portion 71 is installed in the casing 70 so as to pivotably support the pivot portion 73 with respect to the shaft center connecting line O. A gap is provided between the second shaft portion 71 and the casing 70. This gap absorbs influence of a dimensional tolerance, a component variation, and the like. Therefore, it is possible to clamp a pair of pressing roller mechanisms 30 using the clamp arm 66 with excellent balance.

The engagement portion 72 has a connecting portion 75 that is formed in an end of the front clamp arm 67 and extends to the rear clamp arm 68 side from this end, and a curved portion 76 that extends from the end of the connecting portion 75 of the rear clamp arm 68 side to enclose the second shaft portion 71. The curved portion 76 has an outer circumferential wall having an arc shape centered at the shaft center of the second shaft portion 71. The second roller follower 79 of the pivot portion 73 makes contact with the outer circumferential wall of the curved portion 76 and rolls thereon.

Figure 9A:
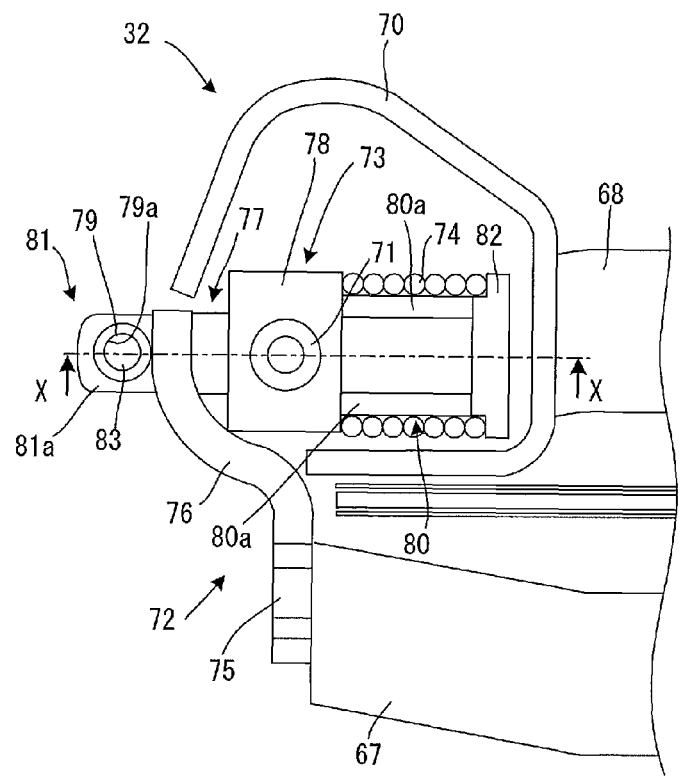
FIG. 9A is a cross-sectional view taken along a line IX-IX of FIG. 2.
Figure 9B:
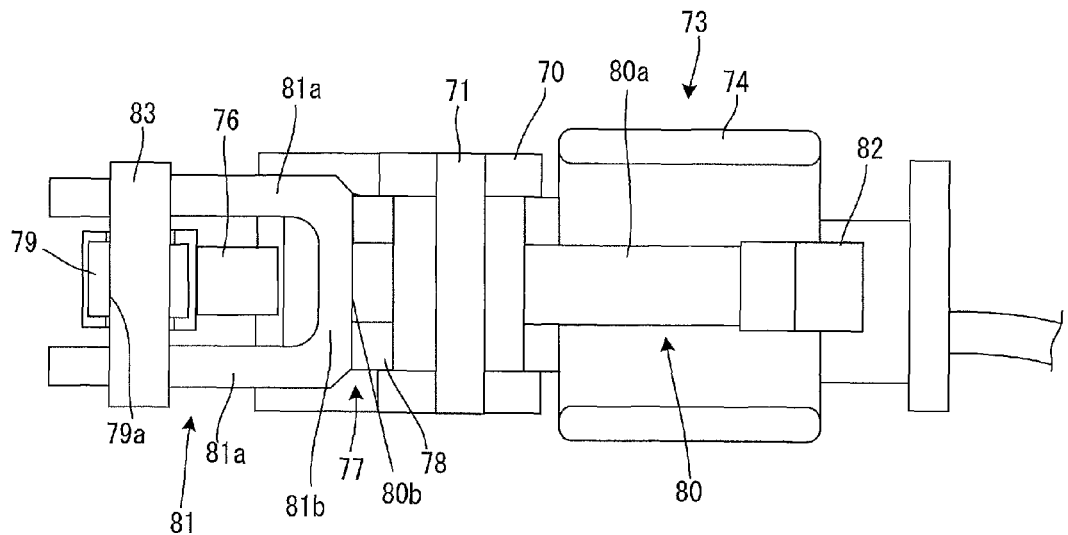
FIG. 9B is a schematic diagram illustrating a cross section taken along a line X-X of FIG. 9A.

As illustrated in FIGS. 9A and 9B, the pivot portion 73 has a pivoting body 77, a rotation transmitting block 78, and a second roller follower 79. The pivoting body 77 has a first body 80 and a second body 81. FIG. 9A is a cross-sectional view taken along the line IX-IX of FIG. 2. FIG. 9B is a schematic diagram illustrating the cross section X-X of FIG. 9A.

The first body 80 is configured by connecting one-side ends of a pair of first plate-like members 80a extending by interposing the second shaft portion 71 through a first bending portion 80b and has an approximately U-shape with the second shaft portion 71 being interposed. The first plate-like member 80a abuts on the outer circumferential wall of the second shaft portion 71 and is supported pivotably by the second shaft portion 71 and slidably along the extending direction of the first plate-like member 80a. The first body 80 has a stopper 82 that supports one end of the compressing spring 74 in the end opposite to the first bending portion 80b.

The rotation transmitting block 78 where the second shaft portion 71 penetrates is pivotably supported by the second shaft portion 71. The rotation transmitting block 78 supports the other end of the compression spring 74 opposite to the end supported by the stopper 82.

As illustrated in FIG. 9B, the second body 81 is configured by connecting one-side ends of a pair of second plate-like members 81a extending perpendicularly to a coaxial direction to interpose the curved portion 76 in the axial direction of the second shaft portion 71 to each other using a second bending portion 81b and has an approximately U-shape. The second bending portion 81b perpendicularly adjoins the first bending portion 80b of the first body 80. The second bending portion 81b abuts on the rotation transmitting block 78 so as to serve as a stopper for preventing the pivoting body 77 from moving in a direction from the second shaft portion 71 toward the compression spring 74. A third shaft 83 for pivoting the pivot portion 73 using a second actuator (not illustrated) penetrates through the second plate-like member 81a. As the third shaft 83 is pivoted, the pivoting body 77 is pivoted with respect to the shaft center of the second shaft portion 71 in synchronization with the second roller follower 79.

[Description of Operation of Thrust Force Adjustment Mechanism]

One end of the compression spring 74 is supported by the rotation transmitting block 78, and the other end is supported by the stopper 82 of the first body 80. The rotation transmitting block 78 is pivotably supported by the second shaft portion 71 installed in the casing 70. For this reason, the pivoting body 77 is biased by a restoring force of the compression spring 74 toward the stopper 82 from the second shaft portion 71 at all times. However, since the second bending portion 81b of the second body 81 positioned oppositely to the compression spring 74 with respect to the second shaft portion 71 abuts on the rotation transmitting block 78, movement of the pivoting body 77 from the second shaft portion 71 to the compression spring 74 is restricted.

The second roller follower 79 is supported by the third shaft 83 engaged with the inner circumferential hole 79a and is provided between a pair of the second plate-like members 81a. The second roller follower 79 abuts on the outer circumferential wall of the curved portion 76, having the spin loss, and rolls thereon. The second roller follower 79 is pivoted by the second actuator using the third shaft 83 in synchronization with the pivoting body 77 centered at the shaft center of the second shaft portion 71 and is biased by the compression spring 74 toward the second shaft portion 71 at all times.

The clamping force adjustment mechanism 32 having the aforementioned configuration changes a direction of the force that biases the second roller follower 79 to the second shaft portion 71 using the compression spring 74 by pivoting the second roller follower 79 with respect to the shaft center of the second shaft portion 71. As a result, a force that presses the front clamp arm 67 toward the rear clamp arm 68 side, that is, the clamping force for clamping a pair of pressing roller mechanisms 30 is changed.

Figures 10A, 10B:
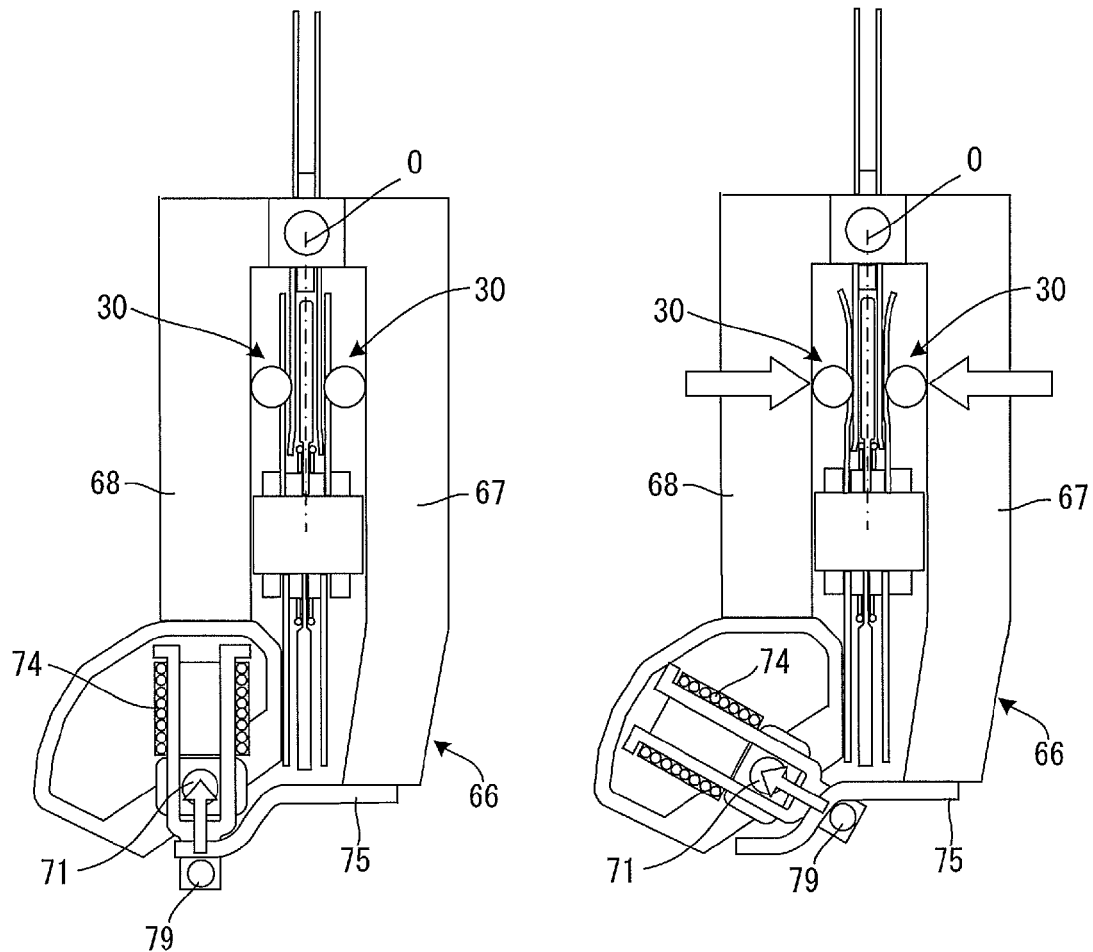
FIG. 10A is a diagram illustrating a relationship between a position of a second roller follower and a clamping force for clamping a pair of pressing roller mechanisms.
FIG. 10B is a diagram illustrating a relationship between a position of the second roller follower and a clamping force for clamping a pair of pressing roller mechanisms.

Here, a relationship between the position of the second roller follower 79 and the clamping force for clamping a pair of pressing roller mechanisms 30 will be described with reference to FIGS. 10A and 10B. FIGS. 10A and 10B are diagrams illustrating a relationship between the position of the second roller follower 79 and the clamping force for clamping a pair of pressing roller mechanisms 30.

In the area where the second roller follower 79 is far from the connecting portion 75, when a direction of the force that biases the second roller follower 79 toward the second shaft portion 71 using the compression spring 74 is in parallel with the shaft center connecting line O as illustrated in FIG. 10A, the force that presses the front clamp arm 67 to the rear clamp arm 68 side using the second roller follower 79, that is, the clamping force for clamping a pair of pressing roller mechanisms 30 using the clamp arm 66 also becomes insignificant or zero. In the following description, this state will be referred to as a "reference position" of the pivot portion 73, and an angle of the second roller follower 79 pivoting from the reference position will be referred to as a "turning angle." In addition, if the second roller follower 79 is further pivoted toward the connecting portion 75 side, this state will be referred to as "the turning angle of the second roller follower 79 is large."

As the turning angle of the second roller follower 79 increases, a direction of the force that biases the second roller follower 79 toward the second shaft portion 71 by the compression spring 74 is changed, so that the force that presses the front clamp arm 67 to the rear clamp arm 68 side using the second roller follower 79 increases, and the clamping force for clamping a pair of pressing roller mechanisms 30 using the clamp arm 66 increases.

Figure 11:
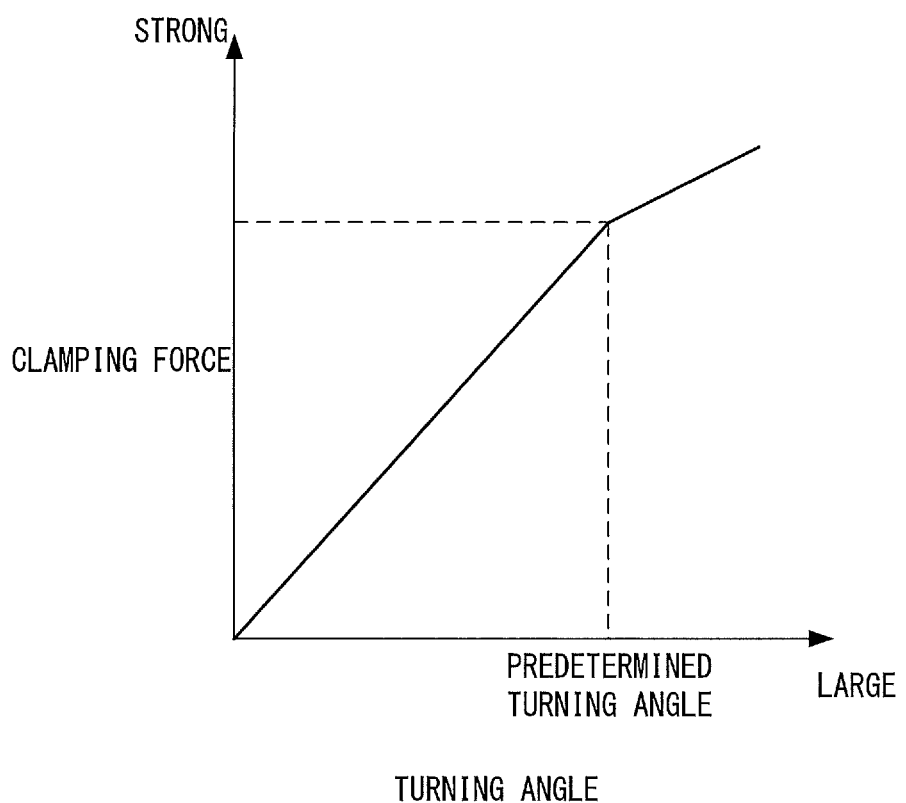
FIG. 11 is a map expressing a relationship between a turning angle and a clamping force of a clamp arm.

As illustrated in FIG. 10B, as the second roller follower 79 makes contact with the connecting portion 75, the clamping force for clamping a pair of pressing roller mechanisms 30 using the clamp arm 66 is maximized. Here, a relationship between the turning angle and the clamping force caused by the clamp arm 66 is expressed in FIG. 11. As the turning angle increases, the clamping force increases. However, it is recognized that, if the turning angle increases over a predetermined value, an increase amount of the clamping force relative to an increase amount of the turning angle is reduced. For this reason, according to this embodiment, a maximum turning angle of the second roller follower 79 is set to a predetermined turning value in FIG. 11. A turning angle at which the second roller follower 79 makes contact with the connecting portion 75 becomes the maximum turning angle, and the connecting portion 75 serves as a stopper for restricting pivoting of the second roller follower 79.

As illustrated in FIG. 1, the ATCU 8 receives a signal from a motor rotation sensor 100 that detects an operation amount of the screw shaft 36 using the first actuator 33, a signal from a first rotation speed sensor 101 that detects a rotation speed of the input shaft 10 of the transmission unit 3, a signal from a second rotation speed sensor 102 that detects a rotation speed of the output shaft 14 of the transmission unit 3, a signal from an oil temperature sensor 103 that detects a temperature of a lubricant supplied to the transmission unit 3, a signal from an angle sensor 104 that detects a turning angle of the second roller follower 79, a signal from an accelerator opening level sensor 105 that detects an accelerator opening level, a signal from an inhibitor switch 106 that detects a position of the selector, and a signal relating to the input torque from an ECU (not illustrated) that controls the engine 2.

The ATCU 8 controls the electric motor 34 and the second actuator of the clamping force adjustment mechanism 32 based on the received signals. The ATCU 8 includes a central processing unit (CPU), a read-only memory (ROM), a random-access memory (ROM), and the like. As the CPU reads a program stored in the RAM, a function of the ATCU 8 is operated.

[Reverse Mechanism]

When the selector is manipulated to an R-position to drive a vehicle backward, first, formation of the torque transmission contact portion is prevented by reducing the clamping force of the clamping force adjustment mechanism 32 and the thrust force of the pressing roller 40. As a result, transmission of a torque from the primary disk 11 to the secondary disk 12 is blocked. In addition, the reverse gear 16 and the input shaft 10 are engaged with each other by moving a coupling sleeve 19a of the synchronization mechanism 19. As a result, rotation of the input shaft is sequentially transmitted to the synchronization mechanism 19, the reverse gear 16, the reverse idler gear 17, and the output shaft 14 in this order to drive the vehicle backward.

[Parking Mechanism]

When the selector is manipulated to a P-position to park the vehicle, the reverse gear 16 is engaged with the input shaft 10 by moving the coupling sleeve 19a of the synchronization mechanism 19. As a result, a rotatable direction of the output shaft 14 becomes opposite to the rotational direction at which the torque transmission contact portion is formed by the pressing roller 40. In addition, the primary disk 11 and the secondary disk 12 are clamped and pressed by a pair of pressing rollers 40 to form the torque transmission contact portion. As a result, a rotational direction of the secondary disk 12 becomes a rotational direction at which the torque transmission contact portion is formed by the pressing roller 40. In this manner, when the selector is manipulated to the P-position, the reverse gear 16 is locked, the disks 11 and 12 are clamped and pressed by the pressing roller 40 to form the torque transmission contact portion, and the transmission unit 3 is interlocked. As a result, it is possible to prevent movement of the vehicle.

When the selector is manipulated to the P-position to park the vehicle, the pressing roller mechanism 30 clamps and presses the primary disk 11 and the secondary disk 12 in a position where the shift ratio becomes the lowest level, and the clamping force generated by the clamping force adjustment mechanism 32 is set to the maximum. As a result, it is possible to increase a breaking force.

Next, the effects of this embodiment will be described.

[Motion of Pressing Roller 40 when No Shift Operation]

A motion of the pressing roller 40 when the transmission unit 3 does not make a shift operation will be described with reference to FIGS. 12A and 12B. The end 42b of the pressing roller shaft 42 in the second support portion 44 side has the spherical shape and is supported by the second support portion 44 using the needle bearing 54 and the support block 46. In addition, the end 42a of the pressing roller shaft 42 in the first support portion 43 side is supported by the first support portion 43 using the needle bearing 53 by providing a predetermined gap in the shaft center connecting line O direction. In this manner, the pressing roller shaft 42 and the pressing roller 40 are supported by the first support portion 43 and the second support portion 44 tiltably in the shaft center connecting line O direction.

Typically, when the pressing roller mechanism 30 is held at a certain position in the disk overlapping area, that is, the vehicle is not in the shift operation, the shaft center of the first shaft portion 57 that rotatably supports the pressing roller 40 matches the shaft center connecting line O as illustrated in FIG. 12A. However, since the pressing roller shaft 42 is tiltably supported by the first and second support portions 43 and 44, the shaft center of the first shaft portion 57 may be inclined to the shaft center connecting line O as illustrated in FIG. 12B. If this state is maintained, a load applied to the pressing roller mechanism 30 increases, so that the pressing roller mechanism 30 may be deteriorated.

In the state of FIG. 12B, a frictional force is generated between the pressing roller 40 and secondary disk 12 as indicated by the solid arrow which is a tangential direction of the secondary disk 12. The frictional force indicated by the solid arrow can be decomposed into force components indicated by dotted arrows perpendicular to the axial line of the pressing roller 40. The force component indicated by the dotted arrow A rotates the pressing roller 40, and the force component indicated by the dotted arrow B generates a moment in the pressing roller 40, so that the pressing roller 40 is forced to return to its original position. In this manner, when the shaft center serving as a rotation center of the pressing roller 40 is inclined against the shaft center connecting line O, a force for returning to its original position is generated in the pressing roller 40, and the pressing roller 40 moves together with the pressing roller shaft 42 such that the shaft center matches the shaft center connecting line O. Therefore, the pressing roller 40 automatically returns to the state of FIG. 12A in which the shaft center matches the shaft center connecting line O.

[Motion of Pressing Roller 40 in Shift Operation]

A description will now be made for a motion of the pressing roller 40 when a shift operation is performed using the transmission unit 3.

The transmission unit 3 implements a continuous speed variation for continuously changing a shift ratio by moving a pair of pressing rollers 40 along the shaft center connecting line O to change a formation place of the torque transmission contact portion in the disk overlapping area.

When the pressing roller 40 is positioned in the input shaft 10 side, a distance from the input shaft 10 to the torque transmission contact portion is short, and a distance from the output shaft 14 to the torque transmission contact portion is long. For this reason, a rotation speed of the secondary disk 12 becomes slower than the rotation speed of the primary disk 11, and the shift ratio increases. As the pressing roller 40 moves to the output shaft 14 side, the distance from the input shaft 10 to the torque transmission contact portion is lengthened, and the distance from the output shaft 14 to the torque transmission contact portion is shortened. For this reason, the rotation speed of the secondary disk 12 becomes fast relative to the rotation speed of the primary disk 11, and the shift ratio decreases. In this manner, as a pair of pressing rollers 40 move from the input shaft 10 side to the output shaft 14 side along the shaft center connecting line O, the shift ratio changes from LOW (high shift ratio) to HIGH (low shift ratio).

The shift operation is performed by moving the second support portion 44 in the shaft center connecting line O direction using the first actuator 33. Movement of the second support portion 44 is transmitted through the pressing roller shaft 42, and the pressing roller 40 and the first support portion 43 move in the shaft center connecting line O direction to follow the second support portion 44 as the second support portion 44 moves. The second support portion 44 is located in the upstream side from the pressing roller 40 in the rotational direction of the primary disk 11, and the first support portion 43 is located in the downstream side from the pressing roller 40 in the rotational direction of the primary disk 11.

Figure 13C:
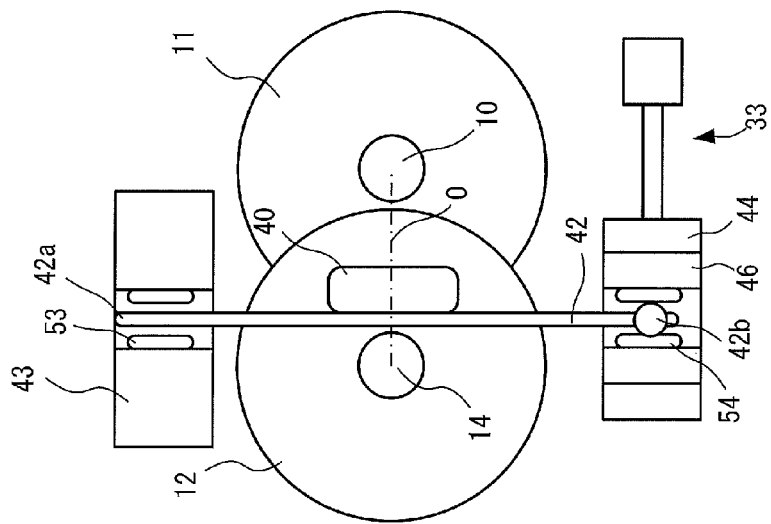
FIG. 13C is a diagram illustrating a motion of the pressing roller when the shift ratio is changed from a low side to a high side.

A description will now be made for a case where the shift ratio changes to the HIGH side with reference to FIGS. 13A, 13B, and 13C.

Figure 13B:
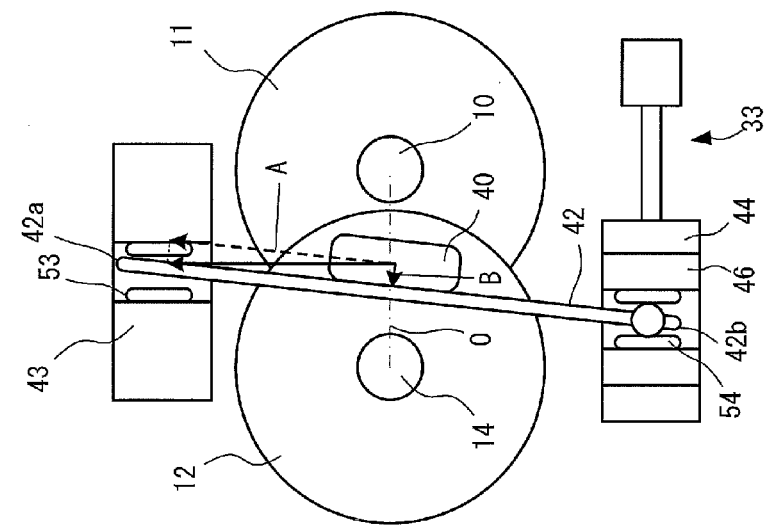
FIG. 13B is a diagram illustrating a motion of the pressing roller when the shift ratio is changed from a low side to a high side.
Figure 13A:
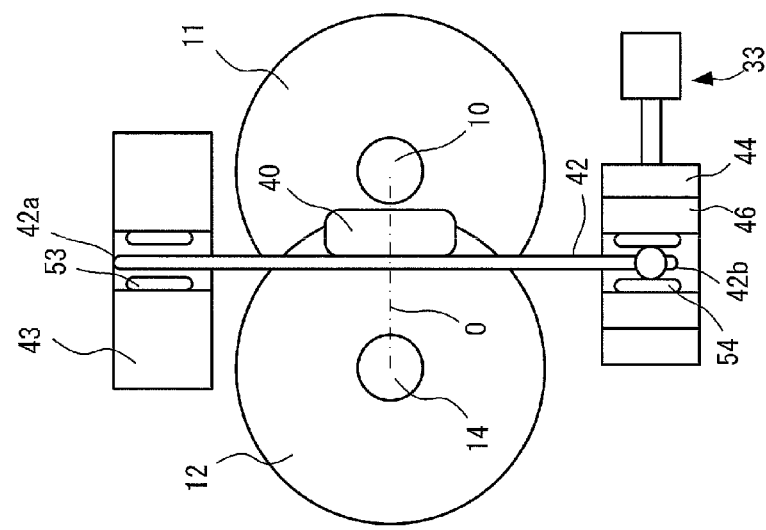
FIG. 13A is a diagram illustrating a motion of the pressing roller when a shift ratio is changed from a low side to a high side.

If the second support portion 44 moves to the output shaft 14 side using the first actuator 33 as illustrated in FIG. 13B from the state that the shift ratio of the transmission unit 3 has a certain value (FIG. 13A), first, the pressing roller shaft 42 is inclined by virtue of the effect of the gap provided in the first support portion 43, and a moment is generated in the pressing roller 40 accordingly, so that the pressing roller 40 starts movement by virtue of the effect of the moment. A frictional force with the second disk 12 is generated in the pressing roller 40 as indicated by the solid line. The frictional force indicated by the solid arrow can be decomposed into force components indicated by dotted arrows as the pressing roller 40 is inclined. A moment is generated in the pressing roller 40 by virtue of the force indicated by the dotted arrow B, so that the pressing roller 40 moves to the output shaft 14 side. That is, as the pressing roller 40 is inclined during the shift operation, a force is generated from the pressing roller 40 itself to move toward the output shaft 14 side, so that the pressing roller 40 moves to the output shaft 14 side to follow movement of the second support portion 44.

As the second support portion 44 moves by the first actuator 33 to a position corresponding to the target shift ratio, the second support portion 44 stops. As the second support portion 44 stops, first, the pressing roller shaft 42 is inclined by virtue of the effect of the gap provided in the first support portion 43 into the state illustrated in FIG. 12B. Accordingly, a moment is generated in the pressing roller 40, and the pressing roller 40 starts to move by virtue of the moment. Then, the shaft center of the first shaft portion 57 that rotatably supports the pressing roller 40 matches the shaft center connecting line O, and the pressing roller 40 is held in a position capable of implementing the target shift ratio as illustrated in FIG. 13C.

Similar to a case where the shift ratio changes to the HIGH side, when the transmission unit 3 changes the shift ratio to the LOW side, a force is generated from the pressing roller 40 to follow movement of the second support portion 44 as the second support portion 44 moves.

In this manner, when the shift operation is performed by moving the pressing roller mechanism 30, the pressing roller 40 is inclined by moving the second support portion 44 in the shaft center connecting line O direction using the first actuator 33, so that a force for moving the pressing roller 40 to the movement direction of the second support portion 44 is generated from the pressing roller 40 itself. For this reason, the transmission unit 3 performs the shift operation by applying a weak force to the second support portion 44 using the first actuator 33.

[Thrust Force Under Same Input Torque]

A description will now be made for the thrust force under the same input torque.

In the pressing mechanism 13, the shaft center of the arm shaft 65 extends perpendicularly to the shaft center connecting line O and intersects with the shaft center of the input shaft 10. In addition, the disk clamp mechanism 31 is provided in the center of the gap between a pair of the primary disks 11. For this reason, when the shaft center of the pressing roller shaft 42 is perpendicular to the shaft center connecting line O, a distance from the shaft center of the input shaft 10 to the torque transmission contact portion, specifically, a distance to the center of the torque transmission contact portion becomes equal to a distance from the shaft center of the arm shaft 65 to the clamping position of the first roller follower 47 using the clamp arm 66, specifically, a distance to the line connecting the shaft centers of a pair of first roller followers 47.

The disk clamp mechanism 31 clamps the pressing roller mechanism 30 by using the arm shaft 65 as the fulcrum. When the clamping force of the clamp arm 66 using the clamping force adjustment mechanism 32 is constant, for example, when the distance from the shaft center of the arm shaft 65 to the first roller follower 47 of the pressing roller mechanism 30 is doubled, the clamping force for clamping a pair pressing roller mechanisms 30, that is, the thrust force of the pressing roller 40 becomes a half.

For this reason, for example, when the shift ratio changes such that the distance from the input shaft 10 to the center of the torque transmission contact portion is doubled, the distance from the shaft center of the arm shaft 65 to the first roller follower 47 is also doubled, and the thrust force of the pressing roller 40 becomes a half. In this case, the thrust force under the same input torque of the input shaft 10 matches the shift ratio.

[Thrust Force Control Using Pressing Mechanism 13]

Next, a description will be made for a thrust force control using the pressing mechanism 13.

The pressing mechanism 13 changes the clamping force for clamping a pair of first roller followers 47 by changing the position of the pressing roller mechanism 30 along the shaft center connecting line O and the turning angle of the second roller follower 79 of the clamping force adjustment mechanism 32 in order to change the thrust force of the pressing roller 40.

In the center of the torque transmission contact portion formed by a pair of pressing roller mechanisms 30, the circumferential speed of the primary disk 11 is equal to the circumferential speed of the second disk 12, and the direction of the position vector is also equal. However, in a position decentered from the center of the torque transmission contact portion, the circumferential speed of the primary disk 11 is different from the circumferential speed of the second disk 12, and the direction of the position vector is also different. For this reason, in the torque transmission contact portion, the spin loss which is a loss in torque transmission is generated due to such facts.

The spin loss serving as a loss in torque transmission is also generated between the pressing roller 40 and the side disk 12b of the secondary disk 12.

According to this embodiment, the spin loss between the pressing roller 40 and the side disk 12b of the secondary disk 12 is reduced by inclining the pressing roller 40 toward the output shaft 14 side. In addition, the spin loss in the torque transmission contact portion is reduced by adjusting the thrust force using the clamping force adjustment mechanism 32.

Here, a description will be made first for the effect of inclining the pressing roller 40. Then, the effect of adjusting the thrust force using the clamping force adjustment mechanism 32 will be described.

[Inclination of Pressing Roller 40]

In order to reduce the spin loss between the pressing roller 40 and the side disk 12*b* of the secondary disk 12, the pressing roller 40 is provided such that a shaft center of the first shaft portion 57 of the holding portion 41 serving as a rotational center of the pressing roller 40 is inclined against the shaft center connecting line O.

Figure 14:
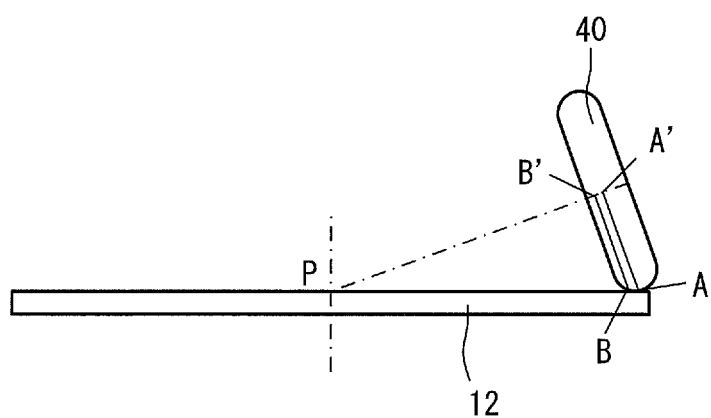
FIG. 14 is a schematic diagram illustrating a state that the pressing roller is inclined to the output shaft side.

As shown in FIG. 14, when an extension line from the shaft center of the first shaft portion 57 intersects with the rotational center P of the side disk 12*b* on the surface of the secondary disk 12, a triangle PAA' is analogous to a triangle PBB', where "A" denotes a center of the torque transmission contact portion, "AA'" denotes a radius of rotation of the pressing roller 40 at the center A, "B" denotes an abutting portion in the output shaft 14 side from the center A, and "BB'" denotes a radius of rotation of the pressing roller 40 in the abutting portion B. As a result, a ratio between PA and PB becomes equal to a ratio between AA' and BB', the circumferential speed of the secondary disk 12 in the center A of the torque transmission contact portion becomes equal to the circumferential speed of the pressing roller 40, and the circumferential speed of the secondary disk 12 in the abutting portion B becomes equal to the circumferential speed of the pressing roller 40. In this case, the spin loss between the secondary disk 12 and the pressing roller 40 is not generated. If the line between the abutting portions A and B is a straight line, the spin loss is not generated. However, if the line between the abutting portions A and B has a curved shape having a different curvature, the spin loss is generated insignificantly.

If the extension line from the shaft center of the first shaft portion 57 does not intersect with the point P even when the pressing roller 40 is inclined, the spin loss is generated between the secondary disk 12 and the pressing roller 40. However, it is possible to reduce the spin loss, compared to a case where the shaft center of the first shaft portion 57 is in parallel with the shaft center connecting line O.

Preferably, the inclination angle of the pressing roller 40 is set such that the extension line from the shaft center of the first shaft portion 57 intersects with the point P.

[Adjustment of Thrust Force of Clamping Force Adjustment Mechanism 32]

(When the Second Roller Follower 79 is Located in the Reference Position)

When the second roller follower 79 is located in the reference position, a direction of the force that biases the second roller follower 79 toward the second shaft portion 71 using the compression spring 74 becomes in parallel with the shaft center connecting line O, so that a force that presses the front clamp arm 67 toward the rear clamp arm 68 using the clamping force adjustment mechanism 32 becomes insignificant or zero. The clamp arm 66 abuts on the first roller follower 47 of the pressing roller mechanism 30 by the side surfaces 67*a* and 68*a* of the disks 11 and 12 side and clamps the first roller follower 47. For this reason, as the force that presses the front clamp arm 67 toward the rear clamp arm 68 side using the second roller follower 79 becomes insignificant or zero, the clamping force for clamping the first roller follower 47 is also reduced.

The pressing roller mechanism 30 is supported by the guide block 49 pivotably with respect to the pivot shaft 52 so as to generate the thrust force by virtue of the clamping force applied to the first roller follower 47 by using the pivot shaft 52 as a fulcrum. When the clamping force for clamping the first roller follower 47 is weak, a force for pivoting the pressing roller mechanism 30 toward the disks 11 and 12 side is weak, the torque transmission contact portion is not formed and rotation is not transmitted from the input shaft 10 to the output shaft 14.

When the second roller follower 79 is located in the reference position, the torque transmission contact portion is not formed. Therefore, it is possible to easily move the pressing roller mechanism 30 along the shaft center connecting line. For this reason, it is possible to easily return the pressing roller 40 to a position where the shift ratio becomes the lowest level even when a downshift control is performed, in which the vehicle stops before the shift ratio is at the lowest level, and the pressing roller 40 is forced to move to the position where the shift ratio becomes the lowest level in preparation for the next start.

It is noted that, if the second roller follower 79 is pivoted from the reference position to the side opposite to the connecting portion 75 side, that is, such that the turning angle is reduced, a force is applied such that the front clamp arm 67 is separated from the rear clamp arm 68 by virtue of a force that biases the second roller follower 79 toward the second shaft portion 71 using the compression spring 74. In order to reliably prevent formation of the torque transmission contact portion, it may be possible to rotate the second roller follower 79 from the reference position to the side opposite to the connecting portion 75 side.

It is noted that the first moment is generated by the biasing portion 45 to incline the pressing roller 40 to the output shaft 14 side, so that the inclination angle of the pressing roller 40 is maintained by the stopper.

(When the Turning Angle of the Second Roller Follower 79 Increases)

When the turning angle of the second roller follower 79 increases, the force that presses the front clamp arm 67 to the rear clamp arm 68 side increases. For this reason, the clamping force for clamping the first roller follower 47 using the clamp arm 66 increases. The clamp arm 66 clamps the first roller follower 47 by using the arm shaft 65 as the fulcrum and using the end opposite to the arm shaft 65 as a point of effort, it is possible to clamp the first roller follower 47 with a weak force.

The curved surface of the curved portion 76 where the second roller follower 79 rolls is formed in an arc shape centered at the shaft center of the second shaft portion 71, and the second roller follower 79 is pivoted with respect to the shaft center of the second shaft portion 71. Therefore, the length of the compression spring 74 is nearly constant regardless of the position of the second roller follower 79. For this reason, it is possible to change the clamping force for clamping a pair of first roller followers 47 by changing a direction of the force that biases the second roller follower 79 toward the second shaft portion 71 using the compression spring 74 without significantly changing a strength of the force. Therefore, it is possible to move the second roller follower 79 with a weak force.

As the clamping force for clamping the first roller follower 47 increases, the pressing roller mechanism 30 is pivoted to the disks 11 and 12 side with respect to the shaft center of the pivot shaft 52.

As the pressing roller mechanism 30 is pivoted to the disks 11 and 12 side with respect to the shaft center of the pivot shaft 52, the side disk 12*b* of the secondary disk 12 is elastically deformed by the pressing roller 40 toward the center disk 12a side to cause the side disk 12b and the disk 11a of the primary disk 11 to make contact with each other. Furthermore, the pressing roller mechanism 30 elastically deforms the disk 11a of the primary disk 11 to the center disk 12a side to cause the disk 11a of the primary disk 11 and the center disk 12a to make contact with each other. As a result, the torque transmission contact portion is formed so that the rotation is transmitted from the input shaft 10 to the output shaft 14.

The pressing roller mechanism 30 generates the thrust force by using the pivot shaft 52 provided in one end 42a side of the pressing roller shaft 42 as the fulcrum and using the first roller follower 47 provided in the other end 42b side of the pressing roller shaft 42 as a point of effort. For this reason, it is possible to form the torque transmission contact portion by causing the primary disk 11 and the secondary disk 12 to make contact with each other with a weak force using a pair of pressing rollers 40 and transmit rotation from the input shaft 10 to the output shaft 14.

As the turning angle of the second roller follower 79 increases, the pressing roller mechanism 30 is further pivoted to the disks 11 and 12 side with respect to the shaft center of the pivot shaft 52, so that the thrust force caused by the pressing roller 40 increases.

It is possible to reduce the spin loss in the torque transmission contact portion by reducing the area of the torque transmission contact portion and approximating the shape of the torque transmission contact portion to a circular shape. However, if the area of the torque transmission contact portion is reduced, a pressure per unit area of the torque transmission contact portion increases when the thrust force caused by the pressing roller 40 increases, so that the primary disk 11, the secondary disk 12, or the pressing roller mechanism 13 may be deteriorated. In this regard, it is possible to suppress deterioration of the primary disk 11, the secondary disk 12, or the pressing roller mechanism 13 while the spin loss is reduced by adjusting the inclination angle of the pressing roller 40.

In the pressing roller 40, the first moment is generated by the biasing portion 45. In addition, the pressing roller 40 receives a reactive force from the disks 11 and 12, and the second moment opposite to the first moment is generated by the reactive force of the disks 11 and 12. The pressing roller 40 is held in a position where the first and second moments are balanced. Since the first moment is generated by the biasing portion 45, a strength of the first moment changes depending on the length of the spring 60. Meanwhile, the strength of the second moment changes depending on the reactive force received from the disks 11 and 12, that is, the thrust force.

When the thrust force is weak, the second moment is weak. Therefore, the pressing roller 40 of the disks 11 and 12 side is pulled to the input shaft 10 side by the biasing portion 45, so that the inclination angle of the pressing roller 40 increases. For this reason, the contact area between the abutting portion 40a and the side disk 12b is reduced to a circle-like shape. In addition, the area of the torque transmission contact portion is also reduced to a circle-like shape. For this reason, the spin loss is reduced in the torque transmission contact portion.

As the thrust force increases, the second moment increases, and the inclination angle of the pressing roller 40 is reduced. As the inclination angle is reduced, a curvature of the abutting portion 40a abutting on the side disk 12b of the secondary disk 12 is reduced, and the contact area between the pressing roller 40 and the side disk 12b increases. For this reason, it is possible to suppress an increase of the contact area and an increase of the pressure per unit area of the torque transmission contact portion even when the thrust force increases. Therefore, it is possible to suppress deterioration of the pressing roller 40 or the disk.

(Shift Ratio Control)

Figure 15:
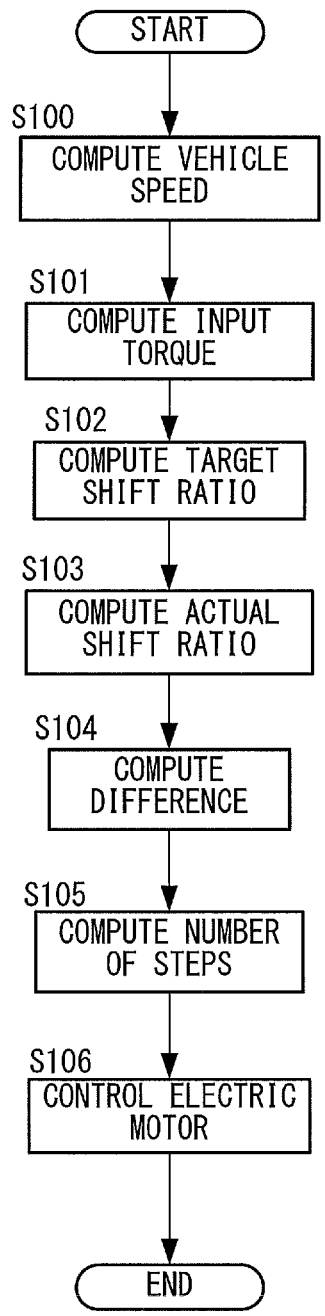
FIG. 15 is a flowchart illustrating a control of the shift ratio.

Next, a description will be made for a shift ratio control using the electric motor 34 with reference to the flowchart of FIG. 15.

In step S100, the ATCU 8 computes a vehicle speed based on a signal from the second rotation speed sensor 102.

In step S101, the ATCU 8 computes the input torque to the transmission unit 3 based on a signal from the ECU.

In step S102, the ATCU 8 computes the target shift ratio using a map preset based on the vehicle speed and the input torque.

In step S103, an actual shift ratio is computed based on a signal from the motor rotation sensor 100.

In step S104, the ATCU 8 computes a difference between the target shift ratio and the actual shift ratio.

In step S105, the ATCU 8 computes a movement amount of the pressing roller mechanism 30 corresponding to the difference, that is, the number of steps corresponding to the manipulation amount of the electric motor 34.

In step S106, the ATCU 8 controls the rotation of the rotation shaft of the electric motor 34 depending on the number of steps. When the difference is a positive value, this means a downshift operation for changing the shift ratio to the LOW side. Therefore, the electric motor 34 moves the pressing roller mechanism 30 to the input shaft 10 side. When the difference is a negative value, this means an upshift operation for changing the shift ratio to the HIGH side. Therefore, the electric motor 34 moves the pressing roller mechanism 30 to the output shaft 14 side. When the difference is zero, the shift operation is not performed. Therefore, the electric motor 34 holds the pressing roller mechanism 30 in the current position. It is noted that an upper limit may be applied to the number of steps.

Through the aforementioned control, the movement of the pressing roller mechanism 30 in parallel with the shaft center connecting line O is controlled, and the shift operation is executed depending on the target shift ratio.

(Thrust Force Control)

Figure 16:
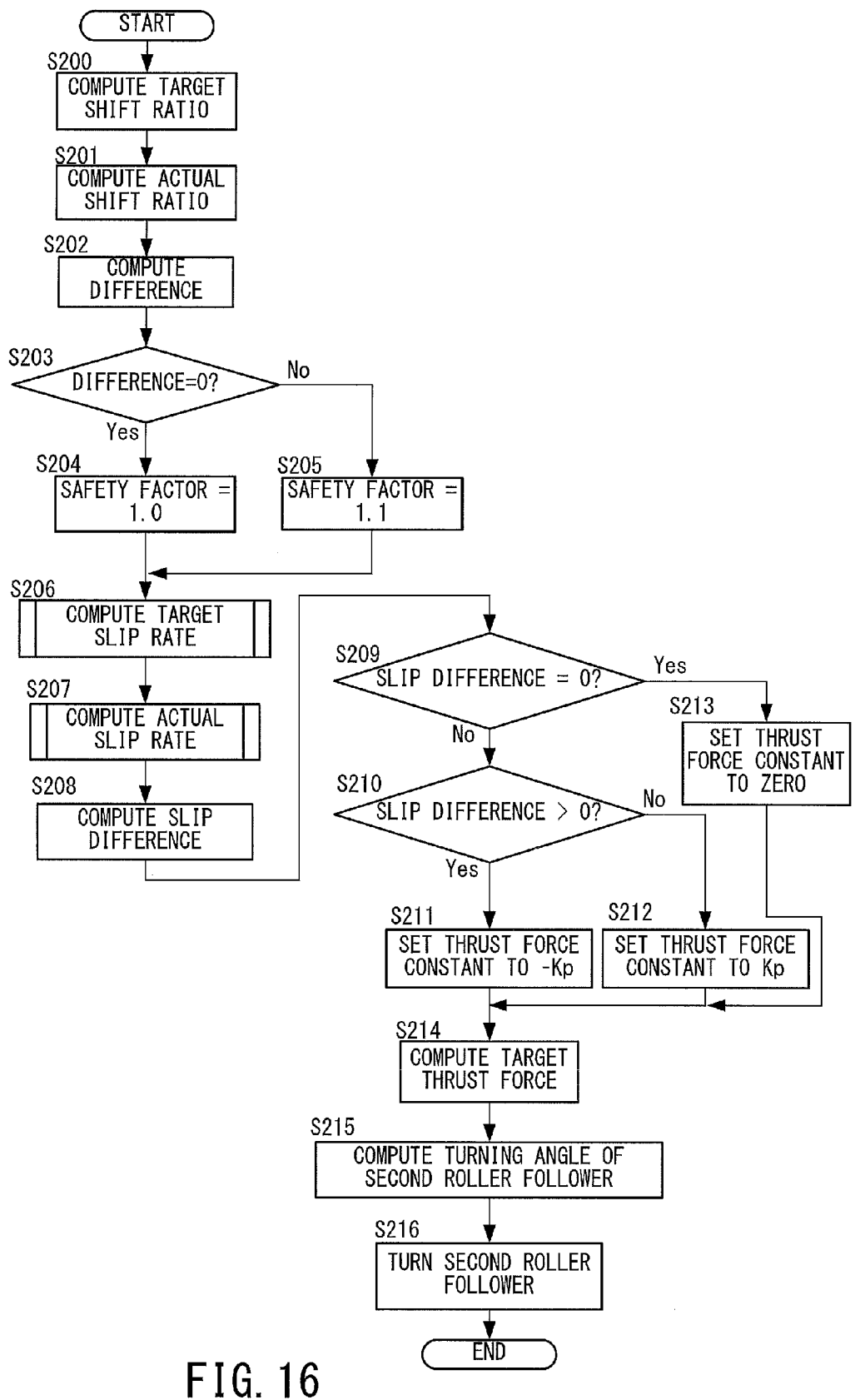
FIG. 16 is a flowchart illustrating a thrust force control using a pair of pressing rollers.

A description will now be made for a thrust force control of the clamping force adjustment mechanism 32 with reference to the flowchart of FIG. 16.

In step S200, the ATCU 8 computes the target shift ratio. A method of computing the target shift ratio is described in steps S100 to S102.

In step S201, the ATCU 8 computes the actual shift ratio based on the signal from the motor rotation sensor 100.

In step S202, the ATCU 8 computes the difference between the target shift ratio and the actual shift ratio.

In step S203, the ATCU 8 determines whether or not the difference is zero. If the difference is zero, the process advances to step S204. If the difference is not zero, the process advances to step S205.

In step S204, the ATCU 8 sets a safety factor to "1.0."

In step S205, the ATCU 8 sets the safety factor to "1.1."

Figure 17:
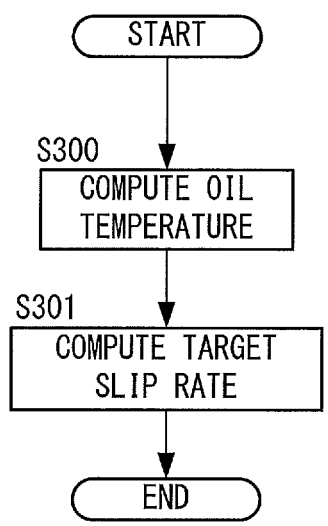
FIG. 17 is a flowchart illustrating a target slip rate computation control.

In step S206, the ATCU 8 computes the target slip rate. The slip rate is a ratio of the slip amount between primary disk 11 and the secondary disk 12 relative to an input rotation speed. A description will now be made for a target slip rate computation control with reference to FIG. 17.

In step S300, the ATCU 8 computes an oil temperature of the oil supplied to the transmission unit 3 based on a signal from the oil temperature sensor.

Figure 18:
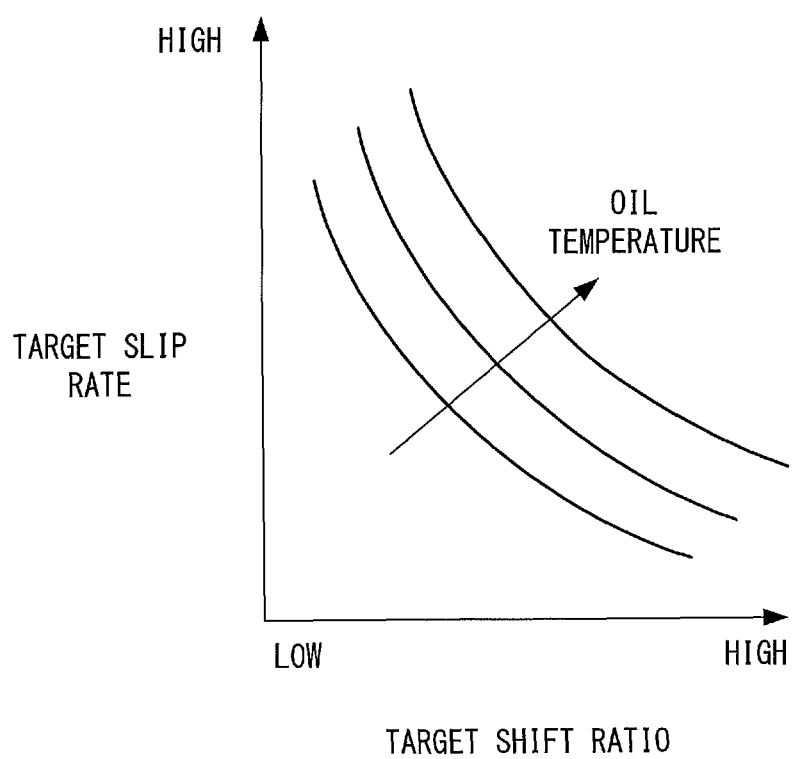
FIG. 18 is a map expressing a relationship between a fluid temperature, target shift ratio, and a target slip rate.

In step S301, the ATCU 8 computes the target slip rate from the map of FIG. 18 based on the oil temperature and the target shift ratio. The target slip rate increases as the shift ratio is shifted to the LOW side, and the oil temperature increases.

Figure 19:
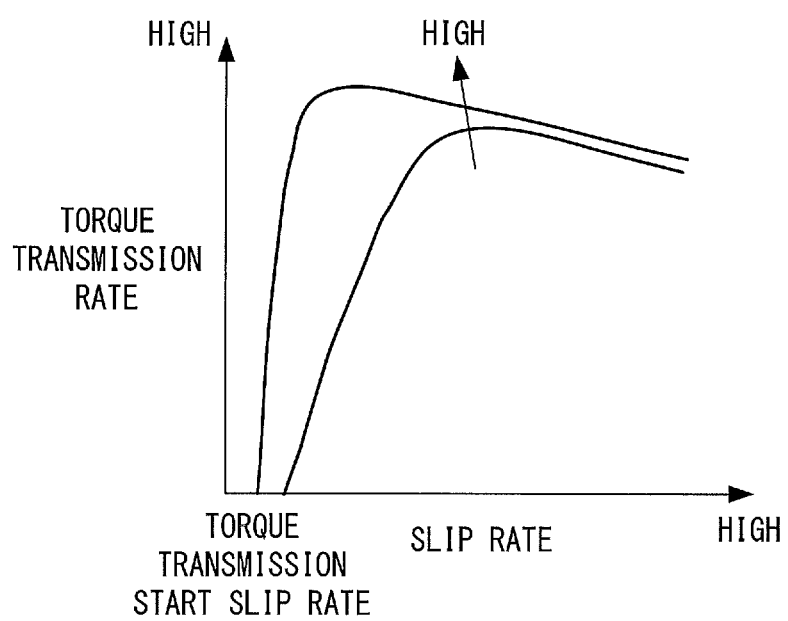
FIG. 19 illustrates a relationship between a slip rate and torque transmission rate from the input shaft to the output shaft.

FIG. 19 illustrates a relationship between the slip rate and the torque transmission rate from the input shaft 10 to the output shaft 14. As illustrated in FIG. 19, it is recognized that the torque transmission rate from the input shaft 10 to the output shaft 14 is high when there is a slight slip. This is because the transmission unit 3 transmits a torque from the input shaft 10 to the output shaft 14 by causing the primary disk 11 and the secondary disk 12 to make contact with each other to form the torque transmission contact portion, and a torque is transmitted in the torque transmission contact portion by causing the primary disk 11 to drag the secondary disk 12. For this reason, in the torque transmission contact portion, it is preferable to increase a ratio of the area capable of transmitting a torque by generating a slip between the primary disk 11 and the secondary disk 12. In addition, it is recognized that the torque transmission rate increases when the slip rate is set to be high in the shift ratio closer to the LOW side compared to the HIGH side.

According to this embodiment, the target slip rate is preset such that the torque transmission rate increases based on FIG. 19, and the computation is performed based on the map of FIG. 18. In this manner, the target slip rate is computed. The target slip rate is set to a value higher than the torque transmission start slip rate of FIG. 19. The torque transmission start slip rate is a value at which a torque can be transmitted even when the shift ratio is at the lowest level.

Figure 20:
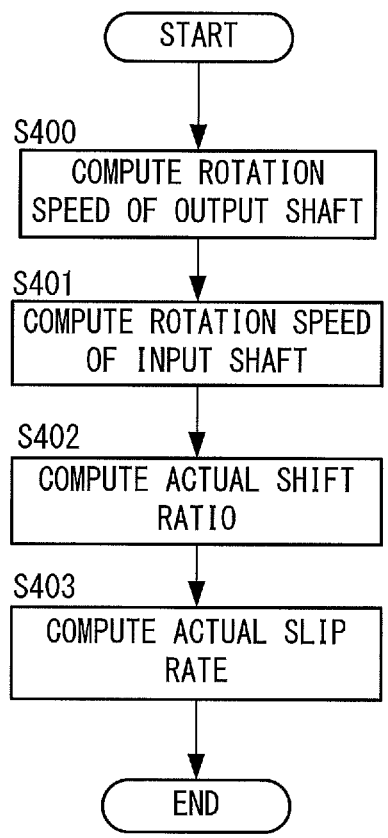
FIG. 20 is a flowchart illustrating a slip rate computation control.

Returning to FIG. 16, in step S207, the actual slip rate is computed. Here, a description will be made for a slip rate computation control for computing the actual slip rate with reference to the flowchart of FIG. 20.

In step S400, the ATCU 8 computes the rotation speed of the output shaft 14 based on a signal from the second rotation speed sensor 102.

In step S401, the ATCU 8 computes the rotation speed of the input shaft 10 based on a signal from the first rotation speed sensor 101.

In step S402, the ATCU 8 computes the actual shift ratio based on a signal from the motor rotation sensor 100.

In step S403, the ATCU 8 computes the actual slip rate based on Equation (1).

(Equation 1)

$$\text{Actual slip rate} = ((\text{rotation speed of input shaft } 10 \times \text{actual shift ratio}) - \text{rotation speed of output shaft } 14) / \text{rotation speed of input shaft } 10 \quad (1)$$

In this manner, the actual slip rate is computed.

Returning to FIG. 16, in step S208, the ATCU 8 computes the difference between the target slip rate and the actual slip rate as a slip difference.

In step S209, the ATCU 8 determines whether or not the slip difference is zero. If the slip difference is not zero, the process advances to step S210. If the slip difference is zero, the process advances to step S213.

In step S210, the ATCU 8 determines whether or not the slip difference is greater than zero. If the slip difference is greater than zero, the process advances to step S211. If the slip difference is smaller than zero, the process advances to step S212.

In step S211, the ATCU 8 sets a thrust force constant to "−Kp," where "Kp" is a predetermined positive value.

In step S212, the ATCU 8 sets the thrust force constant to "Kp."

In step S213, the ATCU 8 sets the thrust force constant to "0."

In step S214, the ATCU 8 computes a target thrust force based on the following Equation (2). It is noted that the target thrust force may be computed based on the current turning angle of the second roller follower 79 and the actual shift ratio.

(Equation 2)

$$\text{Target thrust force} = (\text{actual thrust force} + \text{thrust force constant}) \times \text{safety factor} \quad (2)$$

In step S214, the ATCU 8 computes the clamping force caused by the clamping force adjustment mechanism 32 based on the target thrust force and the target shift ratio and computes the turning angle of the second roller follower 79 that transmits the computed clamping force to the clamp arm 66.

In step S216, the ATCU 8 outputs the computed turning angle of the second roller follower 79 to the second actuator to turn the second roller follower 79.

Through the aforementioned control, it is possible to control the slip rate to reduce the spin loss in the torque transmission contact portion and improve the torque transmission rate.

A description will now be made for the effects of the embodiments of this disclosure.

The pressing roller shaft 42 installed with the pressing roller 40 extends to intersect with the shaft center connecting line O, one end side of the pressing roller shaft 42 is pivotably supported, and the clamping force is applied to the other end to generate the thrust force in the pressing roller 40. Since the pressing roller shaft 42 is pivoted by using one end 42a side as the fulcrum, it is possible to clamp the primary disk 11 and the secondary disk 12 using a pair of pressing rollers 40 by applying a weak clamping force to a pair of pressing roller mechanisms 30 to form the torque transmission contact portion and transmit rotation from the input shaft 10 to the output shaft 14. In addition, since it is possible to transmit rotation from the input shaft 10 to the output shaft 14 by forming the torque transmission contact portion with a weak clamping force, it is possible to reduce a size of the transmission unit 3.

The clamp arm 66 is pivoted with respect to the shaft center of the arm shaft 65 to clamp a pair of pressing roller shafts 42. Since the clamp arm 66 is pivoted by using the arm shaft 65 as the fulcrum, it is possible to clamp the end 42b side of a pair of pressing roller shafts 42 using a weak clamping force. For this reason, it is possible to clamp the primary disk 11 and the secondary disk 12 using a pair of pressing rollers 40 by applying a weak clamping force to form the torque transmission contact portion and transmit rotation from the input shaft 10 to the output shaft 14.

If the transmission unit 3 is seen from the axial direction of the input shaft 10, a distance from the input shaft 10 to the torque transmission contact portion is equal to a distance from the shaft center of the arm shaft 65 to a position where a pair of pressing roller shafts 42 are clamped by the clamp arm 66. As a result, it is possible to set a thrust force under the same input torque of the input shaft 10 to a thrust force matching the shift ratio and rapidly perform the shift operation.

The clamping force adjustment mechanism 32 is provided in the one end of the clamp arm 66 opposite to the arm shaft 65. It is possible to clamp the primary disk 11 and the secondary disk 12 using a pair of pressing rollers 40 using the clamp arm 66 by generating a weak clamping force using the clamping force adjustment mechanism 32 to form the torque transmission contact portion and transmit rotation from the input shaft 10 to the output shaft 14.

The clamping force adjustment mechanism 32 includes the pivot portion 73 pivoted with respect to the shaft center of the second shaft portion 71 connected to the rear clamp arm 68 and the curved portion 76 that is connected to the end of the front clamp arm 67 and has the curved surface centered at the shaft center of the second shaft portion 71. The pivot portion 73 has the second roller follower 79 that abuts and rolls on the curved surface of the curved portion 76 so that the second roller follower 79 is biased to the second shaft portion 71 using the compression spring 74. The clamping force adjustment mechanism 32 can change the clamping force for clamping the pressing roller mechanism 30 using the front and rear clamp arms 67 and 68 just by changing a position of the second roller follower 79. It is possible to change the thrust force of the pressing roller 40 with a weak force and to reduce the size of the transmission unit 3 by reducing a size of the second actuator for turning the second roller follower 79. In particular, by forming the curved surface in the arc shape, it is possible to turn the second roller follower 79 with a weak force.

Since the compression spring 74 is provided in the side opposite to the second roller follower 79 with respect to the second shaft portion 71, and the compression spring 74 is held in a compressed state, it is possible to turn the second roller follower 79 without changing a spring compression amount of the compression spring 74. That is, since the second roller follower 79 can be turned without changing elastic energy of the compression spring 74, it is possible to turn the second roller follower 79 with a weak force. For this reason, it is possible to rapidly turn the second roller follower 79 using a small-sized second actuator and reduce the size of the transmission unit 3 by reducing the size of the second actuator.

By arranging the second roller follower 79 in the vicinity of the reference position, it is possible to set the clamping force of the clamp arm 66 to an insignificant value or zero and prevent formation of the torque transmission contact portion. As a result, it is possible to easily perform the downshift control.

By turning the second roller follower 79 such that the turning angle is reduced from the reference position, it is possible to lengthen the distance between the clamp arms 66 and further reduce the clamping force of the clamp arm 66. As a result, it is possible to reliably prevent the primary disk 11 and the secondary disk 12 from making contact with each other and forming the torque transmission contact portion.

When the gap is not provided between the arm shaft 65 and the clamp arm 66 and between the second shaft portion 71 and the pivot portion 73, it may be difficult to clamp a pair of pressing roller mechanisms 30 using the clamp arm 66 with excellent balance due to a dimensional tolerance, a component variation, and the like. For this reason, for example, a thrust force of one of the pressing rollers 40 becomes smaller than a thrust force of the other pressing roller 40. As a result, it may be difficult to transmit rotation from the primary disk 11 to the secondary disk 12 in the pressing roller 40 side having a smaller thrust force. In addition, a load applied to the pressing roller mechanism 30 having a larger thrust force increases so that the pressing roller mechanism 30 may be deteriorated. In order to prevent such deterioration, a component having a higher strength may be employed. However, this may increase cost. According to this embodiment, by providing the gap between the second shaft portion 71 and the casing 70 even when there is the dimensional tolerance, the component variation, and the like. Therefore, by absorbing such influence using the gap, it is possible to clamp a pair of pressing roller mechanisms 30 using the clamp arm 66 with excellent balance. For this reason, it is possible to transmit the thrust force to the primary disk 11 and the secondary disk 12 using the pressing roller 40 with excellent balance and suppress deterioration of the pressing roller mechanism 30 and the cost increase.

The pressing roller shaft 42 is supported by the first and second support portions 43 and 44 tiltably in the shaft center connecting line O direction, and the second support portion 44 is located in the upstream side from the pressing roller 40 in the rotation direction of the primary disk 11. In addition, the shift operation is performed by moving the second support portion 44 along the shaft center connecting line O using the first actuator 33. As a result, when the pressing roller shaft 42 and the pressing roller 40 are inclined as the second support portion 44 moves during the shift, the force following the movement of the second support portion 44 is generated from the pressing roller 40 itself. For this reason, it is possible to move the pressing roller 40 along the shaft center connecting line O to perform the shift operation by applying a weak force to the second support portion 44 using the first actuator 33. Furthermore, since the force that follows movement of the second support portion 44 is generated in the pressing roller 40 itself, it is possible to rapidly perform the shift operation.

Even when the pressing roller shaft 42 is tilted while no shift operation is performed, it is possible to return the pressing roller 40 and the pressing roller shaft 42 to their original positions by virtue of the force generated in the pressing roller 40.

Since the pressing roller 40 is inclined to the output shaft 14 side, it is possible to reduce the spin loss between the pressing roller 40 and the side disk 12b of the secondary disk 12 and increase a torque transmission rate from the input shaft 10 to the output shaft 14. In particular, when the shaft center of the pressing roller 40 intersects with the rotation center P on the surface of the side disk 12b, it is possible to reduce the spin loss between the pressing roller 40 and the side disk 12b.

It is possible to change the inclination angle of the pressing roller 40, the curvature of the curved surface where the abutting portion 40a of the pressing roller 40 abuts on the side disk 12b of the secondary disk 12, and the shape and the area of the torque transmission contact portion depending on the thrust force of the pressing roller 40. When the thrust force of the pressing roller 40 is large, it is possible to suppress deterioration of the primary disk 11, the secondary disk 12, or the pressing roller mechanism 30 by causing the curved surface having a small curvature to abut on the side disk 12b to increase the area of the torque transmission contact portion. Furthermore, when the thrust force of the pressing roller 40 is small, it is possible to reduce the area of the torque transmission contact portion to reduce the spin loss in the torque transmission contact portion by causing the curved surface having a large curvature to abut on the side disk 12b and making the shape of the torque transmission contact portion in the circle-like shape.

In the pressing roller 40, the first moment is generated by the biasing portion 45, and the second moment opposite to the first moment is generated by the reactive force from the disks 11 and 12 in response to the thrust force of the pressing roller 40. The pressing roller 40 is inclined such that both moments are balanced, and the pressing roller 40 is held in this position. That is, it is possible to automatically change the shape and the area of the torque transmission contact portion depending on the thrust force of the pressing roller 40. It is possible to suitably change the shape and the area of the torque transmission contact portion without controlling with a new actuator.

It is possible to improve the torque transmission rate by computing the target slip rate which is higher than the torque transmission start slip rate at which a torque can be transmitted from the primary disk 11 to the secondary disk 12 and controlling the thrust force of the pressing roller 40 using the clamping force adjustment mechanism 32 such that the slip rate in the torque transmission contact portion reaches the target slip rate. It is possible to improve the torque transmission rate by increasing the target slip rate as much as the shift ratio is lowered.

The primary disk and the secondary disk are the plate-like member having a thin thickness. The primary disk and the secondary disk may not make contact depending on a component variation when they are clamped and pressed by the pressing rollers.

According to this embodiment, by setting the thickness of the center disk 12a of the secondary disk 12 positioned in the center of the axial direction of the input shaft 10 to be thicker than the thicknesses of other disks, it is possible to cause the secondary disk 12 and the primary disk 11 to reliably make contact with each other when the torque transmission contact portion is formed by the pressing roller 40. Therefore, it is possible to improve the torque transmission rate.

Since the side disk 12b is warped to the side opposite to the center disk 12a toward the outer radial direction, it is possible to suppress contact between the side disk 12b and the primary disk 11 in the areas other than the torque transmission contact portion by forming a gap between the side disk 12b and the primary disk 11 without providing a thrust ball bearing.

By changing the lock/unlock state of the dry starter clutch 15 using the first actuator 33 that shifts the pressing roller mechanism 30 in the shaft center connecting line O direction, it is possible to change the lock/unlock state of the dry starter clutch 15 and perform the shift operation of the transmission unit 3 using a single actuator. Therefore, it is possible to reduce the number of actuators and cost. Accordingly, it is possible to reduce a size of the vehicle automatic transmission system 1.

The tapered surface 37a is provided in the bracket 37 that moves in the shaft center connecting line O direction using the electric motor 34, and the lock/unlock state of the dry starter clutch 15 is changed by shifting the pushrod in the axial direction of the input shaft 10 along the tapered surface 37a. Using such a simple and easy configuration, it is possible to change the lock/unlock state of the dry starter clutch 15.

When the vehicle is parked by manipulating the selector to the P-position, the reverse gear 16 is engaged with the input shaft 10, and the primary disk 11 and the secondary disk 12 are clamped and pressed by the pressing rollers 40 to form the torque transmission contact portion. As a result, it is possible to prevent movement of the vehicle by interlocking the transmission unit 3.

According to this embodiment, the gap is formed between the pressing roller shaft 42 and the first support portion 43, and the end of the pressing roller shaft 42 supported in the second support portion 44 side has the spherical shape. However, any configuration may be employed without limiting thereto if the pressing roller shaft 42 and the pressing roller 40 can be tilted in the shaft center connecting line O direction. For example, a gap may be formed between the pressing roller shaft 42 and the second support portion 44.

Although the gap is provided between the second shaft portion 71 and the casing 70 in this embodiment, a gap may be provided between the arm shaft 65 and the clamp arm 66.

Although the torque transmission contact portion is not formed in the reference position in this embodiment, the torque transmission contact portion may not be formed in a position where the second roller follower 79 is turned to the front clamp arm 67 side from the reference position.

The target slip rate may be set to be higher at a slow vehicle speed rather than a fast vehicle speed. In addition, the target slip rate may be set to be higher as the accelerator opening level increases, or the accelerator pedaling amount per unit time increases.

Although the center disk 12a is provided in the secondary disk 12 in this embodiment, the center disk 12a may be provided in the primary disk 11.

The outer circumferential edge side of the primary disk 11 may be warped toward the center disk 12a side of the secondary disk 12. As a result, it is possible to further suppress the contact between the side disk 12b and the primary disk 11 in the area other than the torque transmission contact portion between the side disk 12b and the primary disk 11.

Although the pressing roller 40 is inclined to the output shaft 14 side in this embodiment, the pressing roller 40 may be inclined to the input shaft 10 side.

Although various embodiments of this disclosure have been described hereinbefore, they are just for illustrative purposes and are not intended to specifically limit the technical scope of the invention. Instead, it would be appreciated that that various changes or modifications may be possible without departing from the spirit and scope of the invention.

The invention claimed is:

1. A continuously variable transmission comprising:
   an input shaft connected to a motor and supported by a transmission unit casing member;
   an output shaft arranged in parallel with the input shaft and supported by the transmission unit casing member;
   a discoidal input disk that is provided in the input shaft and has an outer circumferential edge arranged close to the output shaft;
   a discoidal output disk that is provided in the output shaft and has an outer circumferential edge arranged close to the input shaft;
   a pair of pressing units provided movably along a shaft center connecting line obtained by connecting a shaft center of the input shaft and a shaft center of the output shaft in a disk overlapping area where the input disk and the output disk are overlapped, so that a torque transmission contact portion is formed by clamping and pressing both the disks in a position corresponding to a target shift ratio to elastically deform both the disks;
   a pair of first support units that extend to intersect with the shaft center connecting line, support the pressing units by using one end side as a fulcrum, move along the shaft center connecting line in synchronization with the pressing units, and are configured to generate a force for clamping and pressing both the disks using the pressing units by virtue of a clamping force applied to the other end side;
   a pair of second support units that extend along a connecting line in parallel with the shaft center connecting line and are configured to clamp and support both the disks using a pivot shaft as a fulcrum such that the other end side of the pair of first support units can move along the connecting line to generate the clamping force; and
   a clamping force adjustment unit connected to an end of the pair of second support units opposite to the pivot shaft side to adjust the clamping force of the second support units.

2. The continuously variable transmission according to claim 1, wherein the clamping force adjustment unit has
   a shaft portion that is connected to one of the second support unit and extends to intersect to the connecting line direction,
   a curved portion that is connected to the other one of the second support unit and has a curved surface with respect to the shaft center of the shaft portion, a pivot portion that has an abutting portion that abuts on an outer circumferential wall of the curved surface and is configured to pivot with respect to the shaft center of the shaft portion, and biasing unit that is configured to pivot together with the pivot portion to bias the abutting portion toward the shaft portion, wherein the clamping force adjustment unit that is configured to adjust the clamping force caused by the second support units by changing an abutting position between the abutting portion and the curved surface by pivoting the pivot portion.

3. The continuously variable transmission according to claim 2, wherein the clamping force increases as the pivot portion is pivoted, such that the abutting portion approaches the other one of the second support units.

4. The continuously variable transmission according to claim 2, wherein the abutting portion is a cam follower.

5. The continuously variable transmission according to claim 2, wherein the curved surface has an arc shape centered at the shaft center of the shaft portion.

6. The continuously variable transmission according to claim 2, wherein the biasing unit is a compression spring provided in a side opposite to the abutting portion with respect to the shaft portion.

7. The continuously variable transmission according to claim 1, wherein a gap is formed in at least one of a space between the pivot shaft and the second support unit or a space between the shaft portion and the pivot portion.

* * * * *